United States Patent
Watanabe et al.

(10) Patent No.: US 7,232,974 B2
(45) Date of Patent: Jun. 19, 2007

(54) ALL POSITION AUTOMATIC WELDING HEAD AND METHOD FOR OPERATING THE SAME

(75) Inventors: Hiroshi Watanabe, Kure (JP); Toshiharu Myoga, Kure (JP); Masahiro Kanatani, Kure (JP); Koichi Mitsuhata, Kure (JP); Keiji Ueda, Kure (JP); Seiji Kikuhara, Kure (JP); Toshiharu Nagashima, Kure (JP); Shigeru Fujimoto, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/192,174

(22) Filed: Jul. 29, 2005

(65) Prior Publication Data
US 2006/0076318 A1  Apr. 13, 2006

(30) Foreign Application Priority Data
Oct. 13, 2004  (JP)  ............................. 2004-298353

(51) Int. Cl.
  *B23K 9/12* (2006.01)
(52) U.S. Cl. ............................. 219/60 A; 219/125.11
(58) Field of Classification Search ............. 219/60 A, 219/124.03, 125.11
See application file for complete search history.

(56) References Cited

U.S. PATENT DOCUMENTS 4,168,406 A * 9/1979 Torrani ..................... 219/60 A
4,379,215 A   4/1983 Rohrberg
5,107,090 A * 4/1992 Caillet et al. ............. 219/60 A
5,841,089 A  11/1998 Martinenas

FOREIGN PATENT DOCUMENTS

JP      9-271939      10/1997
JP      2001-225165    8/2001

OTHER PUBLICATIONS

English language Abstract of JP 9-271939.
English language Abstract of JP 2001-225165.

* cited by examiner

*Primary Examiner*—Clifford C. Shaw
(74) *Attorney, Agent, or Firm*—Greenblum & Bernstein, P.L.C.

(57) ABSTRACT

A welding head which can easily move the torch portion of the welding head in the circumferential direction and the vertical moving direction of the outer circumference of the to-be-welded tubes even in a narrow gap, includes a torch rotating ring that rotates on the outer circumferences of the tubes by matching with the central axis of the to-be-welded tubes and a torch vertical moving ring disposed concentrically with the ring inside the ring, provided with a torch base for supporting a torch on the front ends, a first gear group for driving and rotating the ring around the tubes, a second gear group that is disposed in parallel to the first gear group and drives and rotates the ring around the tubes, a drive shaft for driving the two gear groups, and a torch rotating motor for driving the drive shaft, and a third gear group that can drive the ring while rotating it in the same direction as or in reverse to that of the ring at a speed equal to or higher or lower than that of the first gear group for rotating the ring around the tubes and vertically moving the torch, and a torch vertical moving motor for driving this third gear group.

15 Claims, 11 Drawing Sheets

FIG. 9
(a)
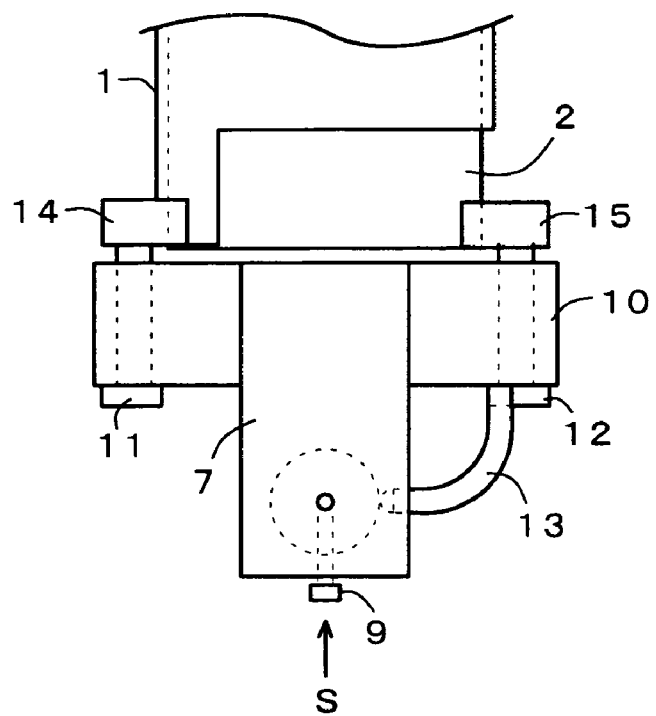
(b)
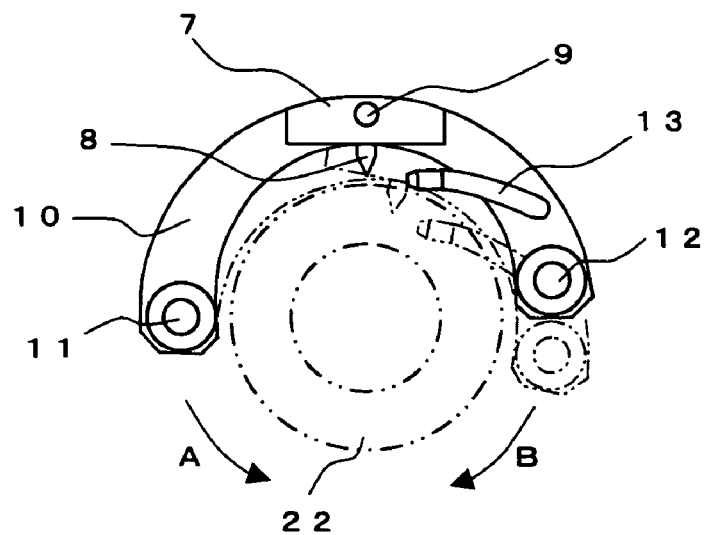

F I G. 1 2
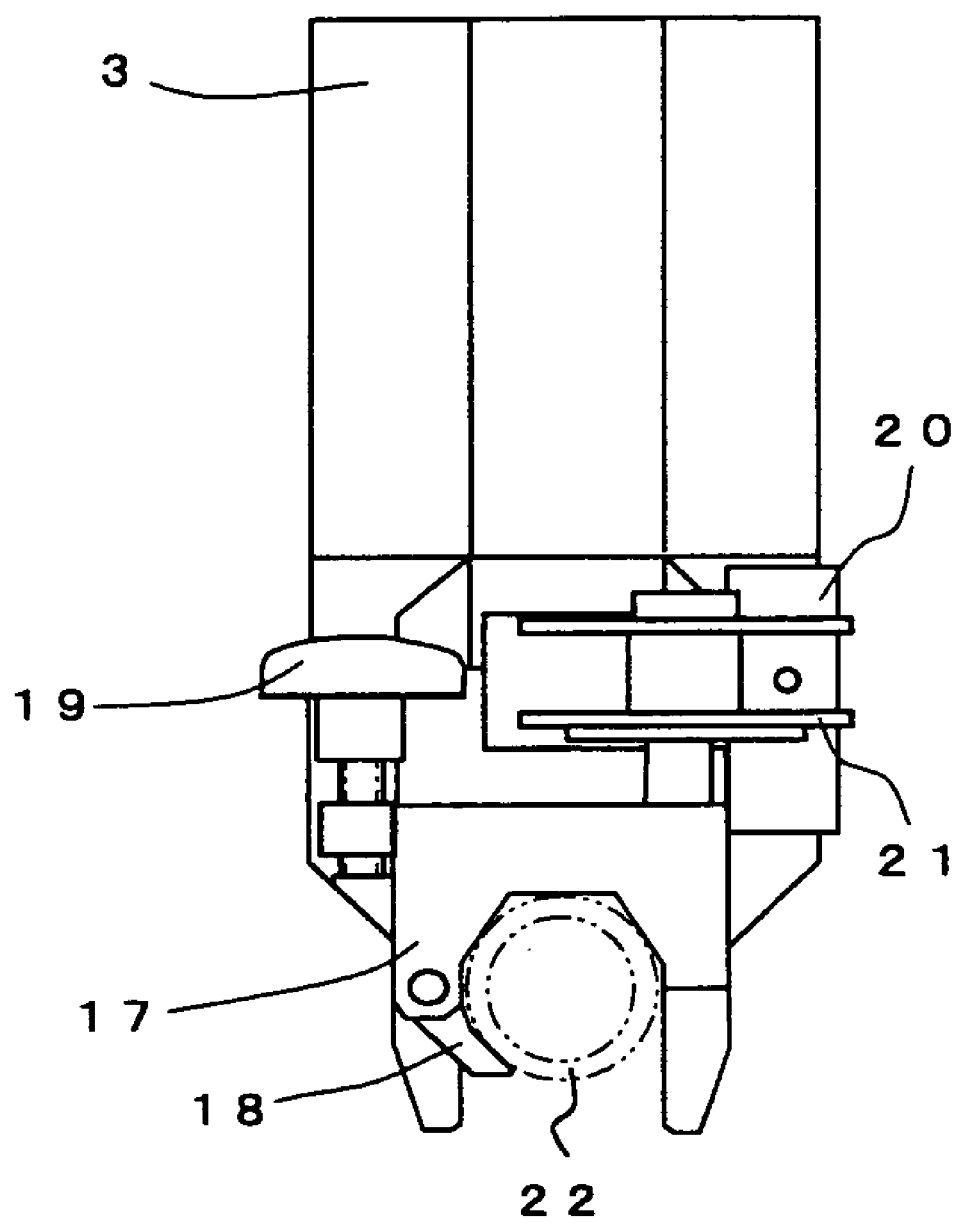

F I G. 1 5
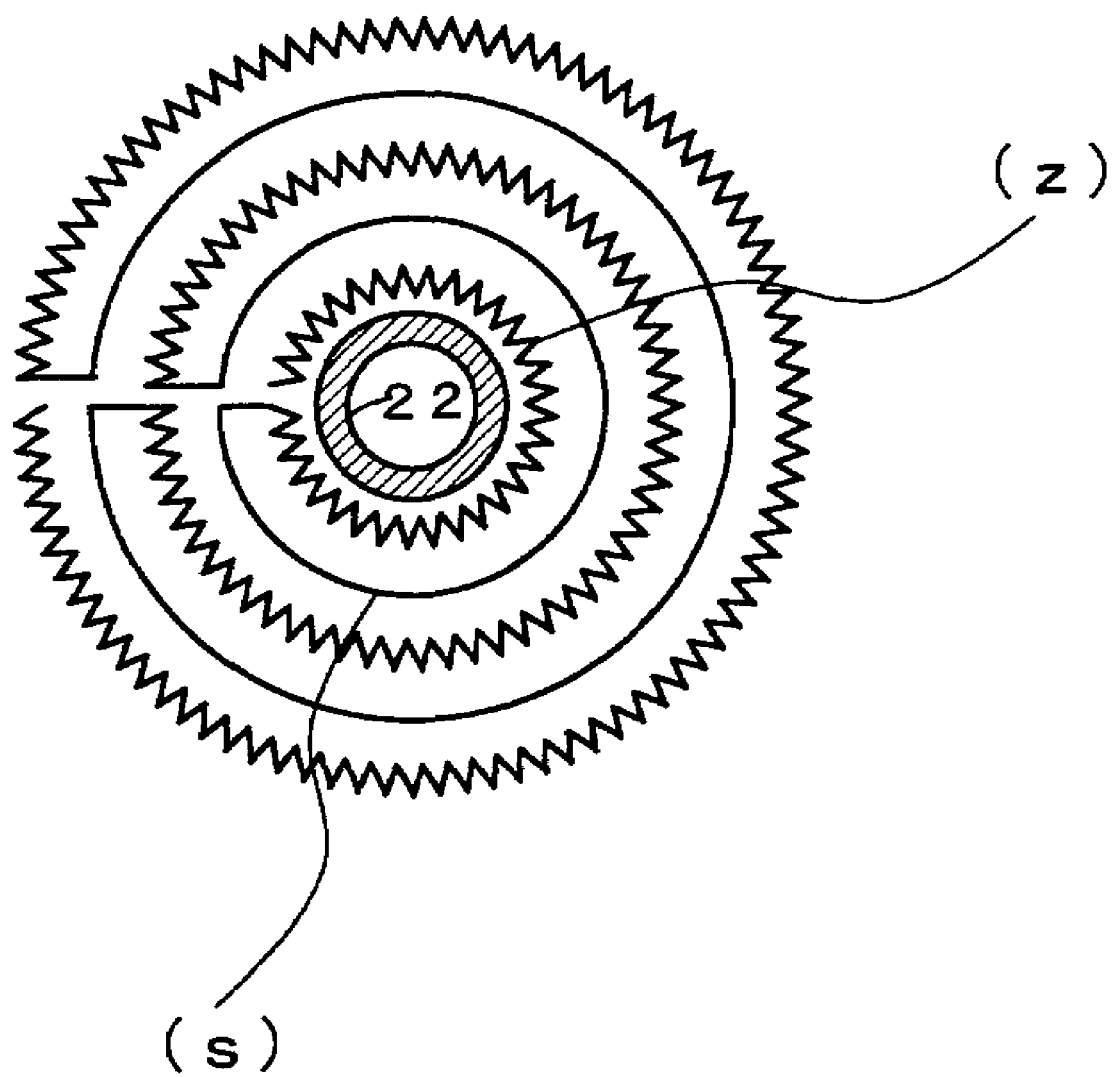

ALL POSITION AUTOMATIC WELDING HEAD AND METHOD FOR OPERATING THE SAME

TECHNICAL FIELD

The present invention relates to a fixed tube butt welding technique, and more specifically, an all position automatic welding head and a method for operating the same which are applied to welding of a tube and a to-be-welded member adjacent to each other with a narrow gap therebetween and realizes all-around all position welding.

BACKGROUND ART

An all position automatic welding apparatus includes all devices necessary for welding such as a welding power supply, a welding head having a torch, a control device for controlling the driving of the welding head, etc., a cooling water circulating pump for cooling the torch. In the all position automatic welding apparatus, for example, in the welding head that is a machine for clamping the to-be-welded tubes 22 and moving the welding torch 7 shown in FIG. 10 through FIG. 12, in particular, an automatic TIG welding head makes a welding head having a torch 7 clamp the fixed tubes 22, rotates the torch 7 along the welding portion on the outer circumference of the tube 22 while inserting a wire (hereinafter, may be referred to as a rotating direction), and simultaneously, while adjusting the arc length by moving the torch 7 in the radial direction of the tube 22 on the outer circumference of the fixed tubes 22 (hereinafter, may be referred to as a movement in the vertical direction or just as a vertical movement), whereby carrying out multi-layer welding. Therefore, the welding head needs a mechanism for moving the torch 7.

A typical example of butt welding of tubes 22 by using the all position automatic welding head is welding of waterwall tubes forming a furnace wall of a boiler. As shown in FIG. 14, a number of tubes 22 are arranged in parallel, a membrane bar 44 is disposed between adjacent two tubes 22, 22, and the bar 44 and the tubes 22 are welded, whereby a waterwall tube (boiler panel) of a furnace wall is obtained. A plurality of such waterwall tubes are prepared according to the specifications of the furnace wall structure, these waterwall tubes are assembled so as to form a furnace wall, and the butting portion of the waterwall tubes is welded and continued with the all position automatic welding head A to form a furnace wall.

As shown in FIG. 14, at the welding portion where tubes 22, 22 of the ends of adjacent two waterwall tubes are butted against each other, both tubes 22, 22 are subjected to edge preparation, and the welding head A is attached to the gap between the two tubes 22, 22 including the non-existence of the membrane bar 44, and the butting portion of both tubes 22, 22 is welded with the torch 7, and this butt welding is carried out by repeating the welding one layer at a time to form a multilayer while rotating the portion of the torch 7 of the welding head A along the outer circumferences of the tubes 22.

Namely, as indicated by the operation locus of the torch 7 in the case of multilayer-welding along the outer circumferences of the tubes 22 in FIG. 15, in order to prevent a cooling water hose for cooling the portion of the torch 7 attached to the welding apparatus or welding power supply wire from being repeatedly wound around the welding head A, an arc is cut for each one-layer welding as shown in zigzag line (z) of the outer circumferences of the tubes 22, the torch 7 is rotated in reverse along the outer circumferences of the tubes 22 to return to the welding start position as shown in straight line(s), and then next-layer welding is carried out. Multilayer welding is carried out by repeating this operation, and in this case, to adjust the arc length for each layer welding and adjust the torch height for the next welding, the welding head A is operated to move in the vertical direction of the tubes 22.

When welding the waterwall tube, the gap between adjacent two tubes 22, 22 forming one waterwall tube is a narrow as 17 mm, and it is required to be movable in the above-mentioned vertical direction on the outer circumferential surfaces of the tubes 22 even in this narrow gap.

As a conventional technique of an automatic welding head A having a torch 7 that is movable in the circumferential direction and vertical direction of the tubes 22 in such a narrow gap, inventions are disclosed in Japanese Published Unexamined Patent Application No. H09-271939 and No. 2001-225165.

DISCLOSURE OF THE INVENTION

The welding head described in Japanese Unexamined Patent Publication No. H09-271939 carries out welding so that, as the movement of the torch portion of the welding head in the circumferential direction of the tubes, a horseshoe-shaped ring attached with the torch disposed across the tubes is moved so as to rotate on the tubes. For rotating the horse-shaped ring on the tubes, a gear that engages with a gear provided on the ring outer circumferential surface is provided inside a welding head main body for clamping the tubes, and driven by a motor provided for driving this gear. The movement of the torch in the vertical direction of the tubes is carried out with a guide shaft fixed to the torch head portion by a micromotor for head vertical driving via a worm gear and a feed screw.

The rotation driving device for the torch portion of the welding head described in Japanese Unexamined Patent Publication No. H09-271939 in the circumferential direction of the tubes is not limited in size since the device is provided in the welding head main body above the tubes, however, the parts for vertical movement of the torch must be downsized since the parts are structured so as to move vertically inside a narrow gap between adjacent tubes. Therefore, for the parts for vertical movement, a micromotor is used. The guide shaft, the worm gear, and the feed screw of the torch head to be driven by the micromotor must be formed into sizes that can pass through the narrow gap, whereby these parts may become expensive and require troublesome maintenance.

The welding head of Japanese Unexamined Patent Publication No. 2001-225165 developed by the present applicant is comparatively low in cost and excellent in maintenance performance since this welding head does not use microminiature parts. This welding head is structured so that the rotating ring and the vertical moving ring of the torch 7 portion are overlapped and disposed concentrically with the tubes 22, however, the vertical movement of the torch portion is made by changing the relative rotation speeds of the rotating ring and the vertical moving ring around the tubes, and the rotating ring and the vertical moving ring are provided with drive systems that are independently driven by separate motors.

Therefore, it is necessary to accurately control the movement speeds of the rotating ring and the vertical moving ring. Particularly, during movement of the rotating ring, the rotation speed of the vertical moving ring must be matched with that of the rotating ring, and controlling of the independent drive systems becomes complicated. In addition, to move the torch portion vertically during operation of the rotating ring, the vertical moving ring is rotating at the same speed as that of the rotating ring, so that the vertical moving ring must be rotated forward or in reverse at a speed higher than or lower than the speed of the rotating ring. In particular, when the vertical moving ring is reversed, the vertical moving ring that is being rotated at the same speed as that of the rotating ring must be reversed only when the torch portion is moved vertically and then returned into the original rotating direction, and at this point, the vertical moving ring must be controlled so as to reach the same speed as that of the rotating ring.

In some cases where the rotating direction of such a vertical moving ring was returned into the original rotating direction from the reversing direction, there were problems that the rotation was delayed due to backlash of the ring drive systems, or that it was difficult to obtain a proper amount of vertical movement of the torch 7.

An object of the invention is to provide an all position welding head for tube butt welding and a method for operating the head whose torch portion can be easily moved in the circumferential direction and the vertical moving direction of the outer circumferences of the to-be-welded tubes, and easily adjusts the moving amount, even in a narrow gap.

The above-described problems are solved by the following solution means of the invention.

A first aspect of the invention provides an all position welding head for tube butt welding, comprising: a welding torch 7; a torch base 10 for supporting the torch 7; a horseshoe-shaped torch rotating ring 1 that rotates on the outer circumferences of the to-be-welded tubes 22 by supporting one end of the torch base 10 by its front end and matching the torch with the central axis of the to-be-welded tubes 22; a horseshoe-shaped torch vertical moving ring 2 that, inside the torch rotating ring 1, supports the other end of the torch base 10 by its front end and is disposed on a circle concentric with the torch rotating ring 1; a torch rotating ring and torch vertical moving ring drive mechanism including a first gear group (30, 27a, 27b, 24a, 23, 29a, 29c, 29e, 29d, and 29f) that can rotate the torch rotating ring 1 around the to-be-welded tubes 22, a second gear group (27c, 24b, 29b, 29g, 29i, 29h, and 29j) that is disposed in parallel to the first gear group and can rotate the torch vertical moving ring 2 around the to-be-welded tubes 22 together with a part (30, 27a) of the first gear group, a drive shaft 27 that can drive the first gear group and the second gear group, and a torch rotating motor 4 that drives the drive shaft 27; a torch vertical moving ring drive mechanism including a third gear group (35 and 28) that drives and rotates the torch vertical moving ring 2 around the to-be-welded tubes 22 together with the second gear group except for the gear 27c, and drives the ring 2 at a speed higher or lower than the speed of the first gear group in the same direction as or in reverse to the rotating direction of the ring 1 during driving the first gear group, and a torch vertical moving motor 5 for driving the third gear group; a control device 100 that controls the driving of the torch rotating ring and torch vertical moving ring drive mechanism and the torch vertical moving ring drive mechanism respectively; a filler wire feed mechanism 20 that feeds a filler wire in the vicinity of the torch 7; and a clamp mechanism that clamps the to-be-welded tubes 22 at a position different from the positions of the two horseshoe-shaped rings 1 and 2.

A second aspect of the invention provides the all position welding head for tube butt welding according to Claim 1, wherein the first gear group that can rotate the torch rotating ring 1 around the to-be-welded tubes 22, includes a gear 30 directly joined to the rotation shaft of the torch rotating ring motor 4, a gear 27a provided at the end of a drive shaft 27 to engage with the gear 30, a sun gear 27b provided on the axis of the drive shaft 27, planet gears 24a to be driven by the rotating driving force of the sun gear 27b, an internal-teeth gear that has a gear on the inner circumferential side to engage with the planet gears 24a, a gear 29a which the rotation shafts 25a of the planet gears 24a are freely fitted to on the side surface and rotate according to revolution of the planet gears 24a around the drive shaft 27, one or more pairs of gears 29c and 29e and pair of gears 29d and 29f that successively transmit a driving force from the gear 29a, and a gear provided on the outer circumference of the torch rotating ring 1 to engage with the gears 29e and 29f, the second gear group that can rotate the torch vertical moving ring 2 around the to-be-welded tubes 22 together with the gears 30 and 27a as a part of the first gear group, includes a sun gear 27c provided on the drive shaft 27 to be driven by a torch rotating ring motor 4, planet gears 24b to be driven by a rotating driving force of the sun gear 27c, a gear 29b that the rotation shafts 25b of the planet gears 24b are freely fitted to on the side surface and rotate according to revolution of the planet gears 24b around the drive shaft 27, one or more pairs of gears 29g and 29i and pairs of 29h and 29j that successively transmit a driving force from the gear 29b, and a gear provided on the outer circumference of the torch vertical moving ring 2 to engage with the gears 29i and 29j, the third gear group that can drive and rotate the torch vertical moving ring 2 around the to-be-welded tubes 22 together with the second gear group except for the sun gear 27c has a gear 35 directly joined to the rotation shaft of the torch vertical moving motor 5 and a rotatable torch vertical moving transmission gear 28 that engages with the gear 35 by its outer circumferential teeth and engages with the planet gears 24b by its inner circumferential teeth, the pair of the planet gears 24a of the first gear group and the planet gears 24b of the second gear group to be driven by the drive shaft 27, the pair of the gear 29a of the first gear group and the gear 29b of the second gear group, the pairs of the gears 29c and 29d of the first gear group and the gears 29g and 29h of the second gear group and the pairs of the gears 29e and 29f of the first gear group and the gears 29i and 29j of the second gear group have the same radiuses, respectively.

A third aspect of the invention provides the all position welding head for tube butt welding according to Claim 1 or 2, wherein the torch rotating ring 1 is driven by the torch rotating motor 4, and the torch vertical moving ring 2 has a gear mechanism to be driven by the torch rotating motor 4 and/or the torch vertical moving motor 5.

A fourth aspect of the invention provides the all position welding head for tube butt welding according to Claim 1, wherein the rotation range of a torch vertical moving transmission gear 28 is limited so that it rotates one turn or less.

A fifth aspect of the invention provides the all position welding head for tube butt welding according to Claim 1, wherein the gear 30 directly joined to the rotation shaft of the torch rotating motor 4 and the gear 27a of the drive shaft 27 to engage with the gear 30 are bevel gears, the gear 35 directly joined to the rotation shaft of the torch vertical moving motor 5 is a cylindrical worm gear, the torch vertical moving transmission gear 28 to engage with the gear 35 is a worm wheel gear, and the rotation shafts of the two motors 4 and 5 are disposed in a direction orthogonal to the center axis of the two rings 1 and 2.

A sixth aspect of the invention provides the all position welding head for tube butt welding according to Claim 1, wherein one end of the arc-shaped torch base 10 that supports the torch 7 is supported onto one front end of the horseshoe shape of the torch rotating ring 1 by a torch support pin 11, the other end of the torch base 10 is supported onto one front end of the horseshoe shape of the torch vertical moving ring 2 by a torch vertical pin 12, and the torch support pin 11 or the torch vertical pin 12 is used as a swing shaft for vertical movement of the torch base 10.

A seventh aspect of the invention provides the all position welding head for tube butt welding according to Claim 1, wherein the clamp mechanism is constructed so as to clamp the to-be-welded tubes 22 so that the center of the axis of the to-be-welded tubes 22 are disposed concentrically with the torch rotating ring 1.

An eighth aspect of the invention provides the all position welding head for tube butt welding according to Claim 1, wherein a torch driving body 3 which houses the base part side of the torch rotating ring 1 and the base part side of the torch vertical moving ring 2 inside the opening part opened downward, and houses the first through third gear groups and the motors 4 and 5 for driving the rings 1 and 2 is provided, and in the body 3, projections 3a and 3b are provided that slide inside grooves 1a and 2a provided along a direction orthogonal to the center of the axis of the rings 1 and 2, respectively.

A ninth aspect of the invention provides a method for operating the all position welding head according to Claim 1, wherein the torch rotating ring 1 is driven by the torch rotating motor 4 and the torch vertical moving ring 2 is driven by the torch rotating motor 4 and/or the torch vertical moving motor 5.

A tenth aspect of the invention provides a method for operating the all position welding head according to Claim 1, wherein the torch rotating ring 1 and the torch vertical moving ring 2 are rotated at the same speed by driving of only the torch rotating motor 4.

An eleventh aspect of the invention provides a method for operating the all position welding head according to Claim 1, wherein the torch vertical moving ring 2 is rotated in a rotating direction at a rotating speed that is the sum of the driving forces of the torch rotating motor 4 and the torch vertical moving motor 5.

A twelfth aspect of the invention provides a method for operating the all position welding head according to Claim 1, wherein before welding the torch rotating motor 4 is driven so as to rotate the torch 7 clockwise or counterclockwise while the torch vertical moving motor 5 is stopped, the torch rotating ring 1 and the torch vertical moving ring 2 are rotated at the same speed to make the torch 7 reach a predetermined position while upward movement of the torch 7 to be apart from the to-be-welded tubes 22 or the downward movement to approach the to-be-welded tubes are stopped, and thereafter, the torch vertical moving ring motor 5 is rotated so as to rotate the torch vertical moving ring 2 clockwise or counterclockwise while the torch rotating motor 4 is stopped, and the torch 7 is moved upward or downward to adjust the position of the torch 7.

A thirteenth aspect of the invention provides a method for operating the all position welding head according to Claim 1, wherein during welding, while the torch 7 is rotated around the to-be-welded tubes 22 by rotating the torch rotating ring 1 and the torch vertical moving ring 2 by the torch rotating motor 4 in a direction matching the inserting direction of the filler wire, (a) when the arc length is proper, the torch vertical moving motor 5 is stopped and both rings 1 and 2 are rotated in the direction at the same speed to carry out welding while the movement of the torch 7 upward to be apart from the to-be-welded tubes 22 or downward to approach the to-be-welded tubes 22 is stopped, (b) when the arc length is short, the torch vertical moving motor 5 is driven so that the torch vertical moving ring 2 rotates in a direction matching the inserting direction of the filler wire or in the opposite direction, and while the torch 7 is moved upward to be apart from the to-be-welded tubes 22, welding is carried out, and (c) when the arc length is long, the torch vertical moving motor 5 is driven so as to rotate the torch vertical moving ring 2 in the direction matching the inserting direction of the filler wire, and while the torch 7 is moved downward to approach the to-be-welded tubes 22, welding is carried out.

A fourteenth aspect of the invention provides the method for operating an all position welding head according to Claim 13, wherein the torch rotating ring 1 is rotated at the predetermined speed, and on the other hand, the rotation speed of the torch vertical moving ring 2 is changed, wherein (a) when the torch vertical moving ring 2 is rotated in a direction matching the inserting direction of the filler wire to move the torch 7 upward, the rotation speed of the torch vertical moving ring 2 is made lower than the rotation speed of the torch rotating ring 1, and (b) the torch vertical moving ring 2 is rotated in a direction matching the inserting direction of the filler wire, and when the torch 7 is moved downward, the rotation speed of the torch vertical moving ring 2 is made higher than the rotation speed of the torch rotating ring 1.

According to first through fourteenth aspects of the invention, (1) torch functional operation such as positional adjustment before welding and (2) torch functional operation during welding of the torch rotating ring 1 and the torch vertical moving ring 2 are roughly as described below. The operating direction of the rings 1 and 2 and the operating direction of the torch 7 are the directions of the arrows A and B shown in FIG. 6 and FIG. 9.

(1) Functional Operation such as Positional Adjustment of the Torch 7 Before Welding
(a) When the torch rotating motor 4 is driven to rotate the torch 7 in the arrow A direction while the torch vertical moving motor 5 is stopped, the rings 1 and 2 rotate at the same speed in the arrow A direction while the vertical movement of the torch 7 is stopped.
(b) When the torch rotating motor 4 is driven to rotate the torch 7 in the arrow B direction while the torch vertical moving motor 5 is stopped, the rings 1 and 2 rotate in the arrow B direction at the same speed while the vertical movement of the torch 7 is stopped.
(c) When the torch vertical moving motor 5 is rotated to rotate the torch vertical moving ring 2 in the arrow A direction while the torch rotating motor 4 is stopped, the torch 7 moves upward while stopping its rotation. In this case, the higher the rotation speed of the torch vertical moving ring 2, the higher the speed of upward movement of the torch 7.
(d) When the torch vertical moving motor 5 is rotated to rotate the torch vertical moving ring 2 in the arrow B direction while the torch rotating motor 4 is stopped, the torch 7 moves downward while stopping its rotation. In this case, the higher the rotation speed of the torch vertical moving ring 2, the higher the speed of the downward movement of the torch 7.

(2) Functional Operation of the Torch 7 During Welding

Welding is started after the positional adjustment of the torch 7 is finished before welding, and the wire inserting direction becomes the welding advancing direction. Namely, the arrow B direction becomes the welding direction, so that during welding, the torch rotating ring 1 and the torch moving ring 2 are rotated in the arrow B direction. In addition, the rotation speed of the torch rotating ring 1 becomes the welding speed, and unless the welding speed is changed, the torch rotating ring 1 rotates at a constant speed.

(a) when the arc length is proper, while the torch vertical moving motor 5 is stopped and the rings 1 and 2 are rotated in the arrow B direction at the same speed, welding is carried out in a condition where movements of the torch 7 upward to be apart from the to-be-welded tubes 22 or downward to approach the to-be-welded tubes are stopped.

(b) When the arc length is short, the torch vertical moving motor 5 is driven to rotate the torch vertical moving ring 2 in the arrow B direction or the arrow A direction, and welding is carried out while the torch 7 is moved upward to be apart from the to-be-welded tubes 22.

In this case, when the torch vertical moving motor 5 is driven to rotate the torch vertical moving ring 2 in the arrow B direction, the rotation speeds of the rings 1 and 2 are set to ring 2<ring 1. The greater the rotation speed difference between the rings 1 and 2, the higher the speed of the upward movement of the torch 7.

When the torch vertical moving motor 5 is driven to rotate the torch vertical moving ring 2 in the arrow A direction, the speed of the upward movement of the torch 7 becomes higher.

(c) When the arc length is long, the torch vertical moving motor 5 is driven to rotate the torch vertical moving ring 2 in the arrow B direction, and welding is carried out while the torch 7 is moved downward to approach the to-be-welded tubes 22.

In this case, the rotation speeds of the rings 1 and 2 are set to ring 2>ring 1. The greater the rotation speed difference between the ring 1 and the ring 2, the higher the speed of the downward movement of the torch 7.

Driving operations of the rings 1 and 2 and the gear groups according to the first aspect of the invention are described in detail.

When the torch rotating motor 4 is driven and the torch vertical moving motor 5 is stopped, and the torch rotating motor 4 drives the drive shaft 27 via the gears (30 and 27a), the first gear group (27b, 24a, 29a, 29c, 29e, 29d, 29f) for driving the torch rotating ring 1 interlocked with the drive shaft 27 except for the gears 30, 27a, and 23 is also driven, whereby the torch rotating ring 1 rotates around the to-be-welded tubes 22. In addition, the drive shaft 27 also drives the second gear group (27c, 24b, 29b, 29g, 29i, 29h, 29j) for driving the torch vertical moving ring 2 via the gears (30 and 27a) as a part of the first gear group, so that the torch vertical moving ring 2 also rotates around the torch rotating ring 1 and the to-be-welded tubes 22.

In addition, when both the torch rotating motor 4 and the torch vertical moving motor 5 rotate, and the torch vertical moving ring 2 to be driven by the second gear group (24b, 29b, 29g, 29i, 29h, and 29j) except for the sun gear 27c and the third gear group (35 and 28) is driven in the same direction as or in reverse to the rotating direction of the torch rotating ring 1 at a speed higher or lower than that of the torch rotating ring 1 that is driven by the first gear group, the rotation speeds of the torch rotating ring 1 and the torch vertical moving ring 2 become different from each other, so that the torch 7 can be moved in the vertical direction with respect to the to-be-welded tubes 22. Thus, the torch 7 rotates around the tubes 22 and the vertical movements between the to-be-welded tubes 22 and the torch 7 become possible, whereby welding is carried out while the arc length is adjusted.

When the torch vertical moving motor 5 rotates while the driving of the torch rotating motor 4 is stopped, since the drive shaft 27 stops its driving, so that the torch rotating ring 1 does not rotate. However, the second gear group (24b, 29b, 29g, 29i, 29h, and 29j) except for the sun gear 27c and the third gear group (35 and 28) that rotate the torch vertical moving ring 2 drive the ring 2, the torch 7 can be moved in the vertical direction with respect to the to-be-welded tubes 22.

According to the second and third aspects of the invention, when the torch rotating motor 4 is driven, the drive shaft 27 provided with, on its one end, a bevel gear 27a that engages with the gear 30 rotates, and the sun gears 27b and 27c of the drive shaft 27 revolve the planet gears 24a and the planet gears 24b around the drive shaft 27, respectively. Due to the revolution of the planet gears 24a, the gear 29a rotates around the drive shaft 27, and a driving force that is transmitted to the gear 29a, the gear 29c, and the gear 29e in order and the driving force that is transmitted to the gear 29a, the gear 29d, and the gear 29f in order rotate the torch rotating ring 1. Due to the revolution of the planet gears 24b, the gear 29b rotates around the drive shaft 27, and a driving force that is transmitted to the gear 29b, the gear 29g, and the gear 29i in order and the driving force that is transmitted to the gear 29b, the gear 29h, and the gear 29j in order rotate the torch vertical moving ring 2.

In this case, when the torch vertical moving motor 5 stops, the torch vertical moving transmission gear 28 becomes unable to rotate as in the case with the internal-teeth gear 23 fixed to the body 3, so that the revolution speed of the planet gears 24b that engages with the gear on the inner circumferential side of the torch vertical moving transmission gear 28 around the drive shaft 27 becomes equal to the revolution speed of the planet gears 24a around the drive shaft 27. Therefore, when only the torch rotating motor 4 is driven, the torch rotating ring 1 and the torch vertical moving ring 2 rotate around the tubes 22 at the same speed.

In the case where the torch rotating motor 4 and the torch vertical moving motor 5 are both driven, the internal-teeth gear 23 of the first gear group is always unrotatable, so that the torch rotating ring 1 is rotated by only the driving force of the torch rotating motor 4, however, the torch vertical moving transmission gear 28 to be driven by the driving force of the torch vertical moving motor 5 is able to rotate on its axis on the drive shaft 27, and therefore, the planet gears 24b revolve around the drive shaft 27 at a speed higher or lower than the revolution speed of the planet gears 24a around the drive shaft 27 in the same direction as or in reverse to that of the planet gears 24a.

Therefore, the torch vertical moving ring 2 rotates in a rotating direction at a rotation speed that is the sum of the driving forces of the torch rotating motor 4 and the torch vertical moving motor 5. Namely, the torch vertical moving ring 2 rotates in the same direction as or in reverse to that of the torch rotating ring 1 at a speed higher or lower than that of the torch rotating ring 1. As a result, a rotation speed difference occurs between the torch rotating ring 1 and the torch vertical moving ring 2, and the torch 7 moves in the vertical direction with respect to the to-be-welded tubes 22.

In addition, when the torch vertical moving motor 5 rotates while the torch rotating motor 4 stops its driving, the drive shaft 27 stops its driving, so that the torch rotating ring 1 does not rotate, however, the torch vertical moving transmission gear 28 rotates, so that the planet gears 24b that engage with the internal-teeth gear of the gear 28 revolve around the drive shaft 27. Due to the revolution of the planet gears 24b, the spur gear 29b rotates, and a driving force of the spur gear 29b is transmitted to the spur gear 29g and the spur gear 29i in order and the spur gear 29h and the spur gear 29j in order, respectively, and the torch vertical moving ring 2 is rotated by the spur gear 29i and the spur gear 29j. In this case, the torch rotating ring 1 never moves, so that the torch 7 moves upward or downward according to the rotating direction of the torch vertical moving ring 2. Thereby, the vertical movements are made between the tubes 22 and the torch 7 while the torch 7 is not rotated around the tubes 22, whereby the welding start position adjustment or the like is carried out.

According to the invention, it is also allowed that the ring 1 is formed as a torch vertical moving ring and the ring 2 is formed as a torch rotating ring, and the gear 23 is made rotatable, and then the internal-teeth gear thereof is driven by the torch vertical moving motor 5, and the internal-teeth gear of the torch vertical moving transmission gear 28 is fixed to the torch driving body 3.

According to the fourth aspect of the invention, the rotation range of the torch vertical moving transmission gear 28 can be limited by a limit switch 38 or the like so as to rotate a ⅓ turn instead of one turn, and the vertical moving amount of the torch 7 is limited to a predetermined range.

According to the fifth aspect of the invention, the rotation shafts of the torch rotating motor 4 and the torch vertical moving motor 5 are disposed orthogonal to the central axis of the two rings 1 and 2 that clamp the to-be-welded tubes 22, so that the large-sized motors 4 and 5 and related parts thereof can be disposed without interference with the clamp mechanism (clamp block 17, clamp 18, etc.) for clamping the to-be-welded tubes 22.

According to the sixth aspect of the invention, the torch support pin 11 and the torch vertical pin 12 are used as swing shafts of the vertical movements of the torch 7, so that the distance between the torch 7 and the to-be-welded tubes 22 can be changed.

According to the seventh aspect of the invention, the to-be-welded tubes 22 can be clamped by the clamp mechanism so that the center of axis of the to-be-welded tubes 22 is disposed concentrically with the two rings 1 and 2, whereby welding in the circumferential direction of the butting portion between the to-be-welded tubes 22 becomes possible.

According to the eighth aspect of the invention, the projections 3a and 3b of the torch driving body 3 can slide inside the grooves 1a and 2a provided along the rotating directions of the rings 1 and 2 on the outer circumferential surfaces on the base part sides of the two rings 1 and 2, so that the rings 1 and 2 are unable to move in the central axial directions of the rings 1 and 2 and are supported onto the torch driving body 3 so as to rotate radially.

According to the ninth through fourteenth aspects of the invention, the torch rotating ring 1 and the torch vertical moving ring 2 of the all position welding head according to any of the first through eighth aspects of the invention can be driven and controlled by the torch rotating motor 4 and/or the torch vertical moving motor 5, so that the torch 7 can be freely rotated and/or moved vertically around the to-be-welded tubes 22.

According to the first through third aspects and ninth through fourteenth aspects of the invention, even at a butting portion with a narrow space between the to-be-welded tubes 22 and 22, welding in the circumferential direction can be easily carried out. In particular, the adjustment of the vertical moving amount of the butting portion between the to-be-welded tubes 22 and 22 becomes easier than in the conventional arts, so that a high-quality welded tube can be obtained at low costs with efficient welding performance.

According to the fourth aspect of the invention, in addition to the effects of the first and second aspects of the invention, the vertical moving amount of the torch 7 can be limited, so that troubles in that the torch 7 is moved in contact with the adjacent tubes 22 or beyond the operation limit and breaks the motors 4 and 5 and the gears can be prevented.

According to the fifth aspect of the invention, in addition to the effects of the first and second aspects of the invention, large-sized parts such as the torch rotating motor 4 and the torch vertical moving motor 5 can be disposed at positions without interference with the clamp mechanism that clamps the to-be-welded tubes 22, so that the degree of freedom in designing increases, and parts with comparatively low costs can be used.

According to the sixth aspect of the invention, the distance between the torch 7 and the to-be-welded tubes 22 can be adjusted by swinging the torch base 10, so that a welding head can be obtained at a comparatively low cost which realizes stable vertical movements of the torch 7 without increasing the number of parts.

According to the seventh aspect of the invention, the clamp mechanism for clamping the to-be-welded tubes 22 is not disposed near the torch rotating ring 1, so that the welding portion and the clamp mechanism are set comparatively apart from each other, whereby the clamp mechanism does not need to be made of a highly heat-resistance material, and a welding head with excellent welding performance is obtained at low costs.

According to the eighth aspect of the invention, the torch driving body 3 clamps the rings 1 and 2 with a degree of freedom in the rotating direction and the vertical direction while saving the number of parts, and clamps the rings 1 and 2 in a rotatable manner in their rotating directions and supports these in an unmovable manner in the axial direction of the rings 1 and 2, so that a low-cost welding head with excellent welding performance is obtained.

BRIEF DESCRIPTION OF DRAWINGS

FIG. 9(a) is a partial enlarged view of FIG. 11, and FIG. 9(b) is a view from the arrow S direction of FIG. 9(a);

FIG. 12 is a back view of the all position welding head for tube butt welding of FIG. 10;

FIG. 15 is a view of a locus of a welding operation of the welding head when butt-welding tubes.

BEST MODE FOR CARRYING OUT THE INVENTION

An embodiment of the invention is described with reference to the drawings.

Figure 1:
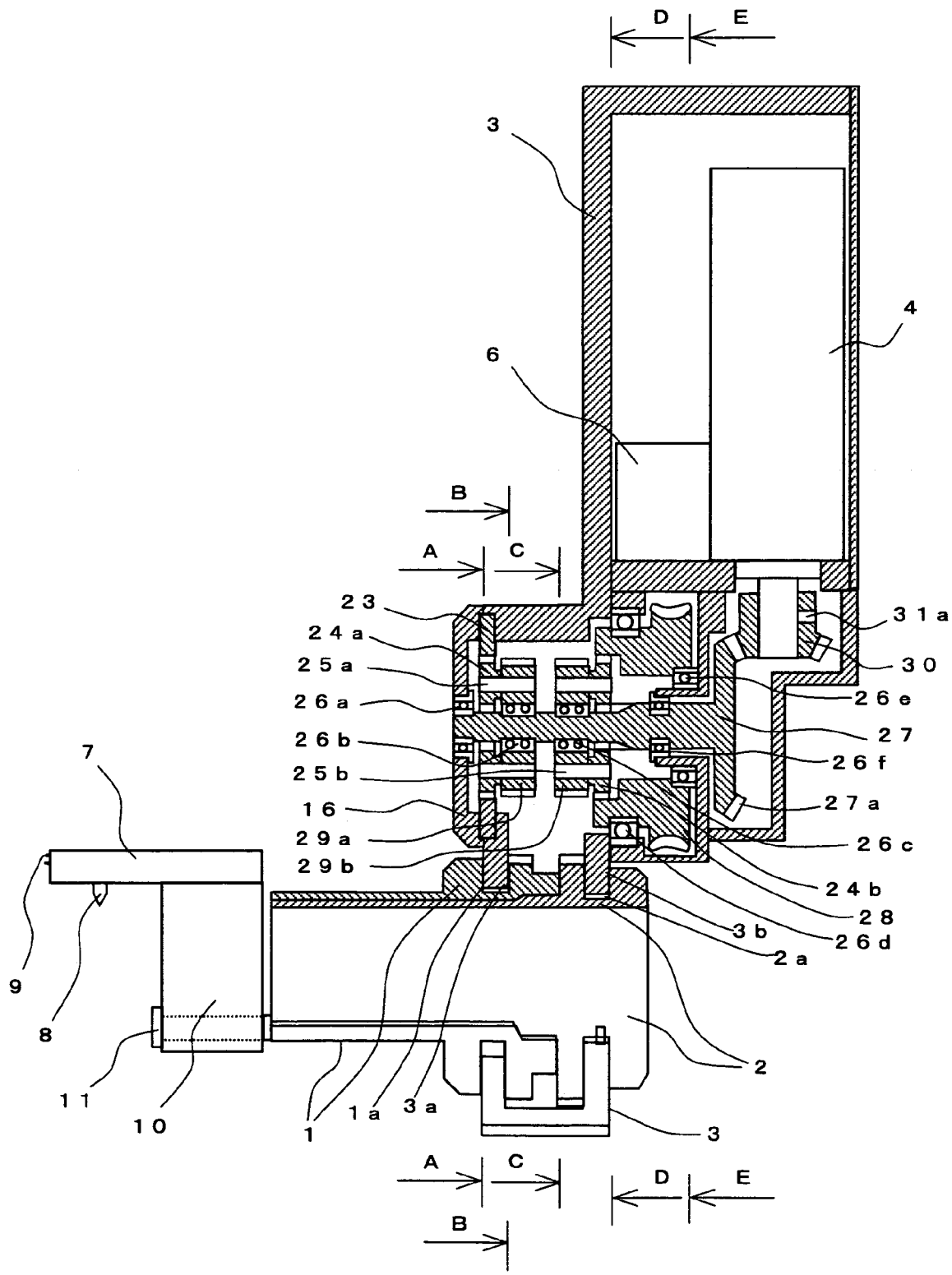
FIG. 1 is a sectional view along the A—A line of FIG. 10 showing an all position welding head for tube butt welding of an embodiment of the invention.
Figure 2:
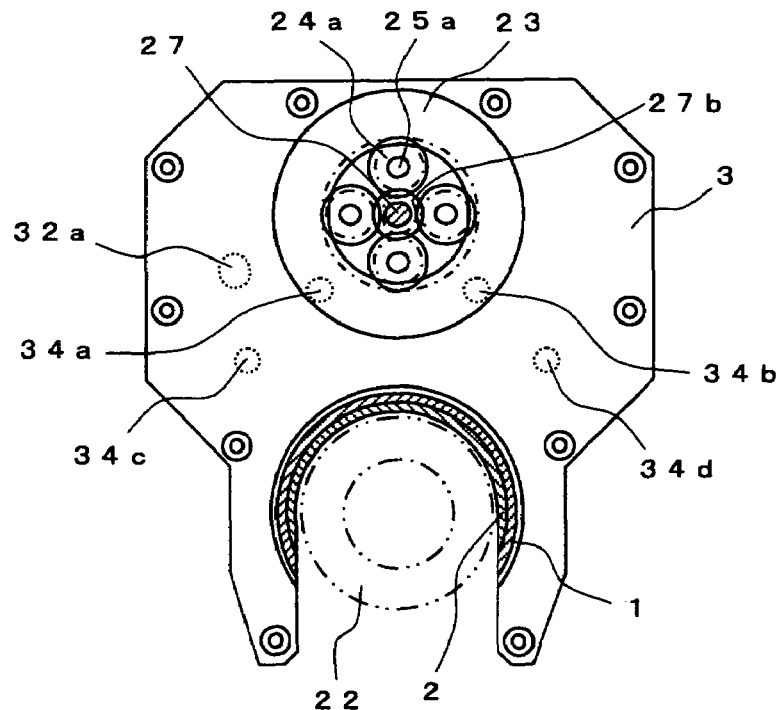
FIG. 2 is a sectional view partially on the arrow A—A of FIG. 1.
Figure 3:
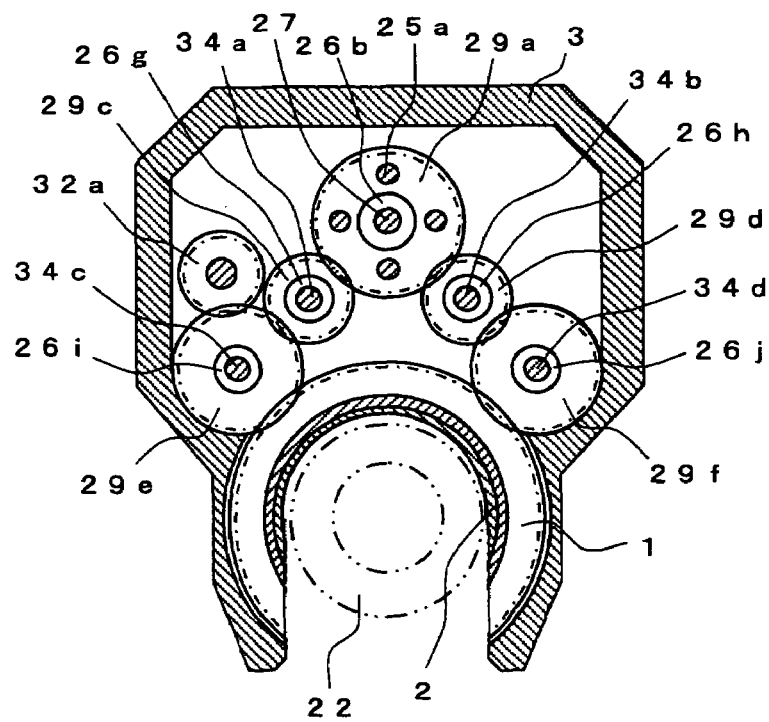
FIG. 3 is a sectional view on the arrow B—B of FIG. 1.
Figure 4:
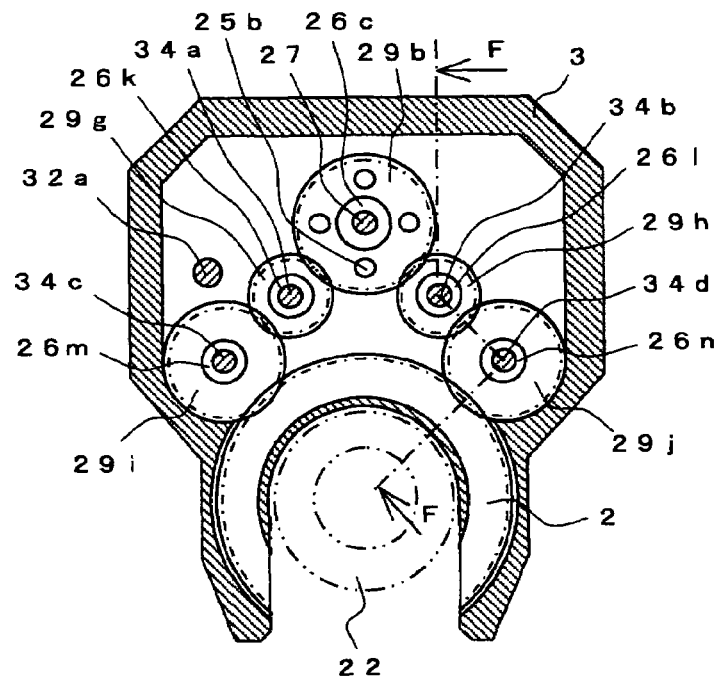
FIG. 4 is a sectional view on the arrow C—C of FIG. 1.
Figure 5:
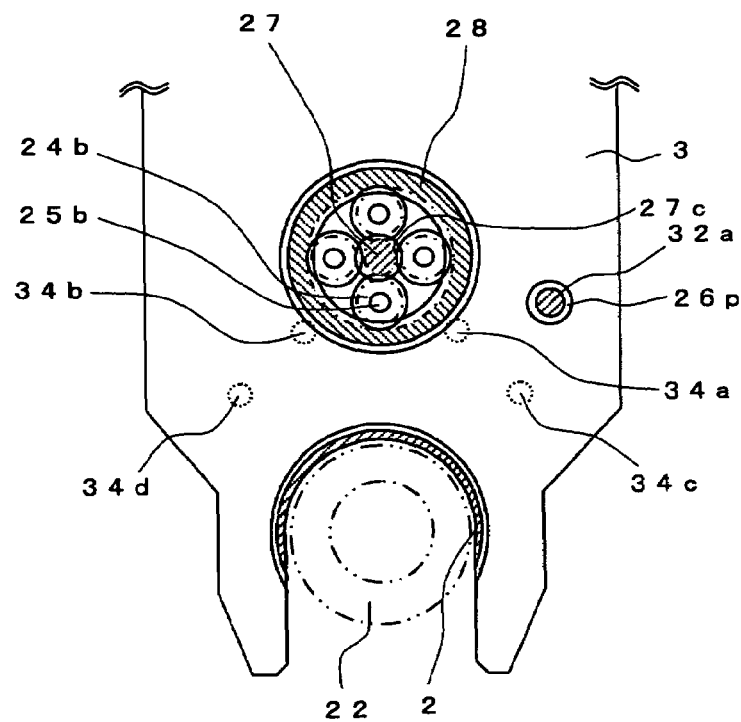
FIG. 5 is a sectional view on the arrow D—D of FIG. 1.
Figure 6:
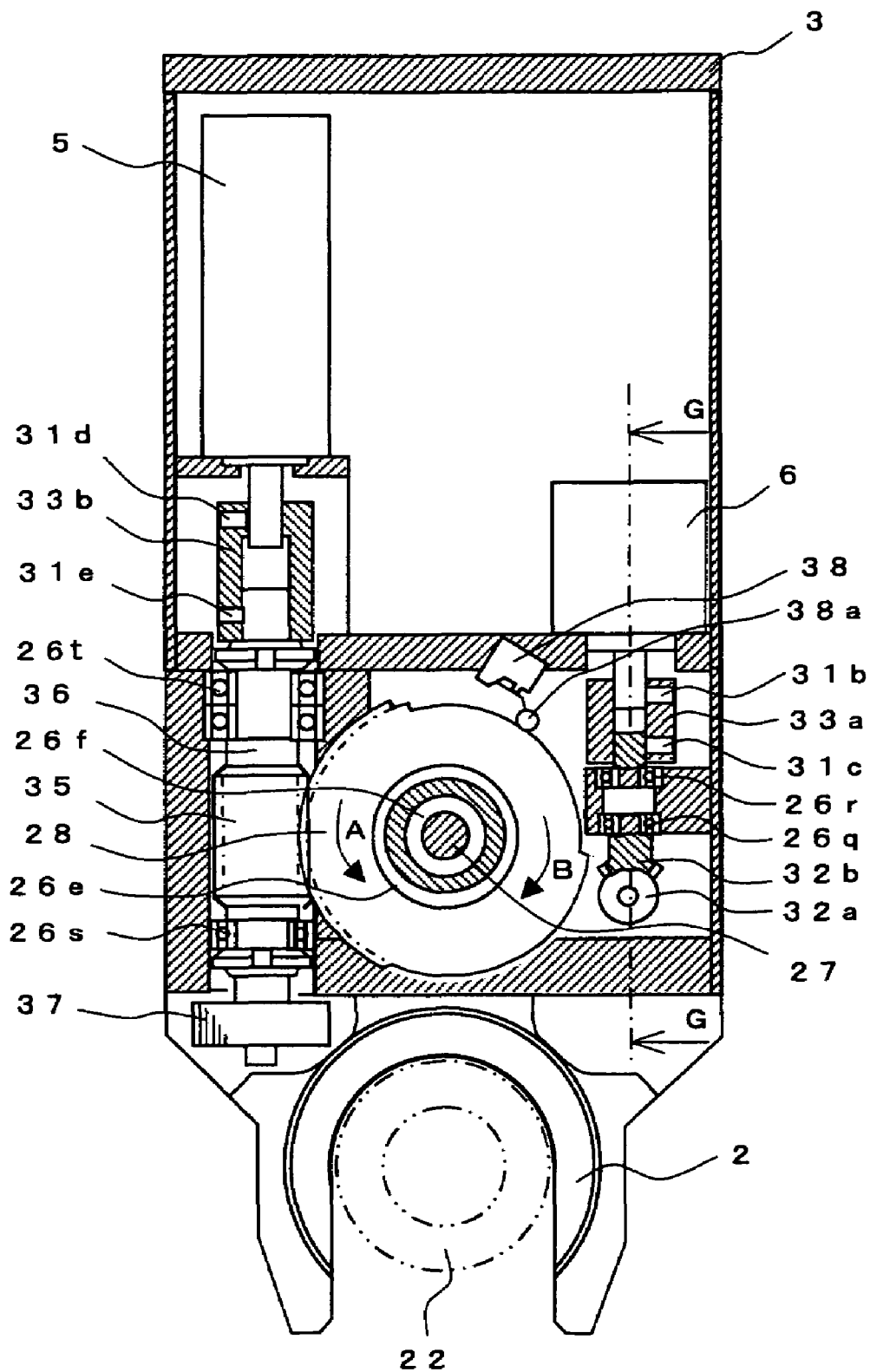
FIG. 6 is a sectional view on the arrow E—E of FIG. 1.
Figure 7:
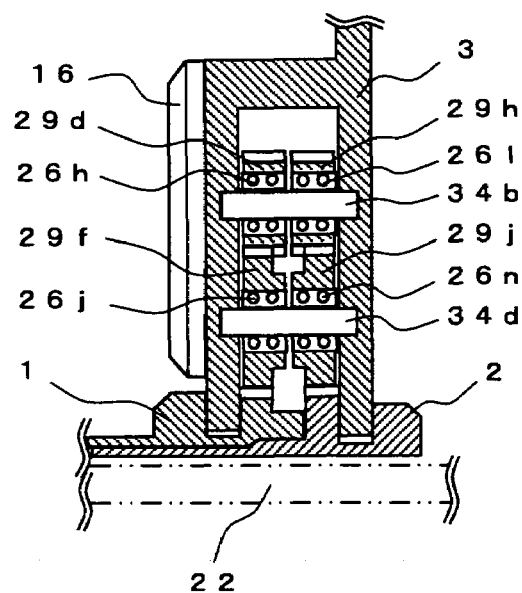
FIG. 7 is a sectional view on the arrow F—F of FIG. 4.
Figure 8:
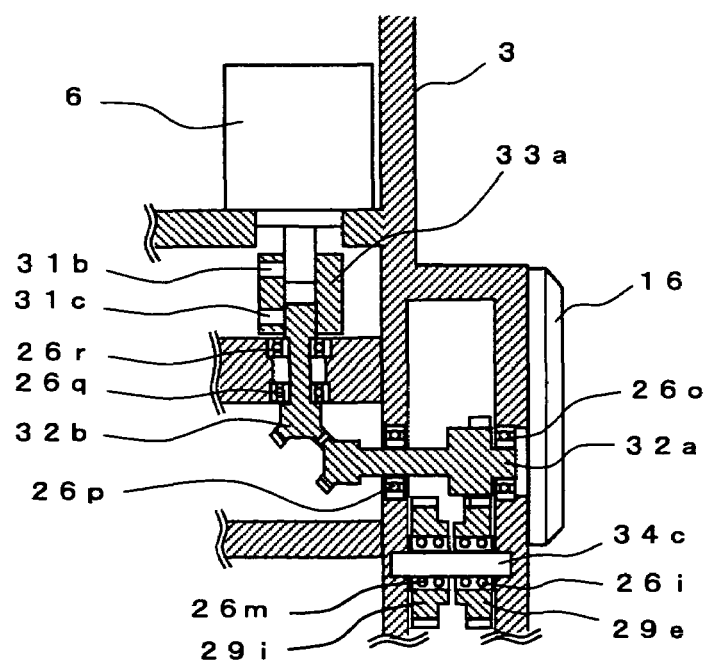
FIG. 8 is a sectional view on the arrow G—G of FIG. 6.
Figure 10:
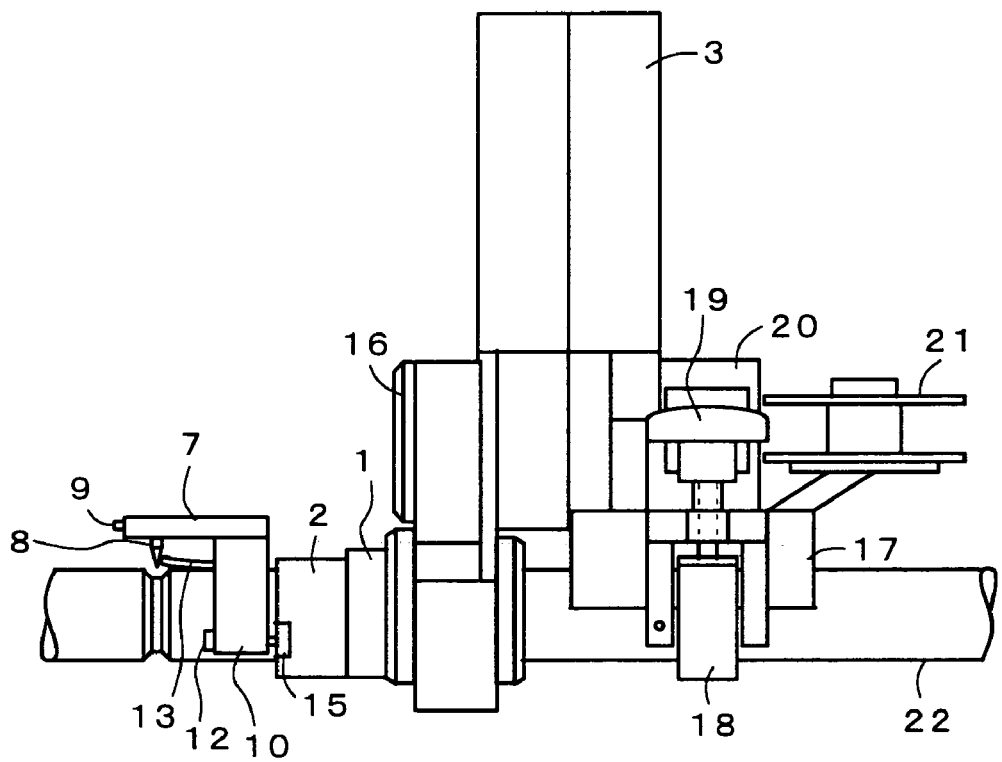
FIG. 10 is a side view of the all position welding head for tube butt welding of the embodiment of the invention.
Figure 11:
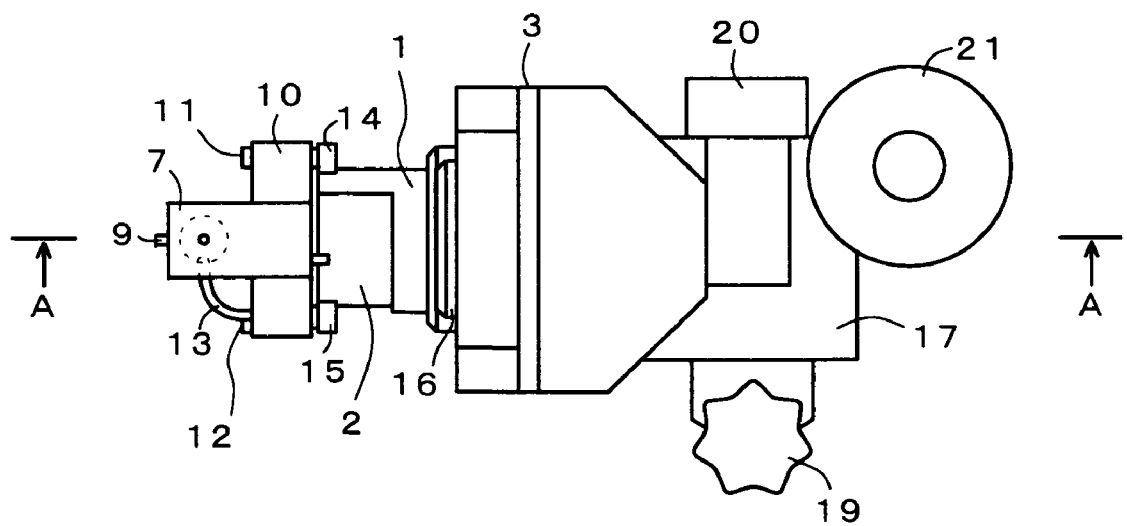
FIG. 11 is a plan view of the all position welding head for tube butt welding of FIG. 10.

A side view of the all position welding head for tube butt welding of this embodiment is shown in FIG. 10, a plan view thereof is shown in FIG. 11, and a back view thereof is shown in FIG. 12. A part of the sectional view on the arrow A—A of FIG. 11 is shown in FIG. 1, and the sectional view on the arrow A—A of FIG. 1 is shown in FIG. 2, the sectional view on the arrow B—B of FIG. 1 is shown in FIG. 3, the sectional view on the arrow C—C of FIG. 1 is shown in FIG. 4, and the sectional view on the arrow D—D of FIG. 1 is shown in FIG. 5. The sectional view on the arrow E—E of FIG. 1 is shown in FIG. 6, the sectional view on the arrow F—F of FIG. 4 is shown in FIG. 7, the sectional view on the arrow G—G of FIG. 6 is shown in FIG. 8, a partially enlarged view of FIG. 11 is shown in FIG. 9(a), and the view from the arrow S direction of FIG. 9(a) is shown in FIG. 9(b).

In this specification, the side with the presence of the torch base 10 connected to the torch drive part body 3 is referred to as the fore side, and the opposite side of the torch base 10 with respect to the torch drive part body 3 is referred to as the rear side.

To the fore lower side of the torch drive part body 3, horseshoe-shaped cylindrical torch rotating ring 1 and torch vertical moving ring 2 that clip the tubes 22 are concentrically attached. In this case, the ring 1 is overlapped above the ring 2 so that these become rotatable. Therefore, the tubes 22 to be clamped by the clamp mechanism (including the crank block 27, the clamp 28, and the hand knob 29, etc.) are freely fitted to the inside of the torch vertical moving ring 2.

In addition, the rear halves of the torch rotating ring 1 and the torch vertical moving ring 2 are freely supported so as to be held inside the lower end opening of the torch drive part body 3 as shown in FIG. 3 and FIG. 4, and inside grooves 1a and 2a provided on the respective rings 1 and 2, projections 3a and 3b projecting from the lower side of the torch drive part body 3 are inserted, so that the rings 1 and 2 do not come out forward and rearward although these are rotatable in their rotating directions.

The torch drive part body 3 clamps the rings 1 and 2 with a degree of freedom in the rotating directions, and the rings 1 and 2 can be supported so that these are unable to move in the axial direction of the rings 1 and 2 although these are freely rotatable in their rotating directions, so that a low-cost welding head is obtained.

Furthermore, a gear mechanism for driving the torch rotating ring 1 and the torch vertical moving ring 2 is disposed inside the torch drive part body 3. On the fore side of the gear mechanism, a cover 16 covering the opening of the body 3 is provided. The torch rotating motor 4 and the torch vertical moving motor 5 that serve as driving force sources of the gear mechanism are housed in the upper side inside the torch drive part body 3.

In addition, on the fore side portion of the horseshoe-shaped torch rotating ring 1, an arc-shaped torch base 10 is provided, the front and rear direction of one end of the torch base 10 is fixed to the torch rotating ring 1 by the torch support pin 11 and the torch support pin fixing block 14, the torch 7 is fixed to the fore side of the torch base 10, and a non-consumable electrode 8 is attached to the bottom of the torch 7.

Furthermore, the other end of the torch base 10 is fixed in the front and rear direction of the fore side of the torch vertical moving ring 2 by the torch vertical moving pin 12 and the torch vertical moving pin fixing block 15.

Therefore, when the vertical moving ring 2 is rotated by a drive mechanism described later, the torch base 10 supported at its end to the vertical moving ring 2 by the torch vertical moving pin 12 swings around the torch support pin 11 or the torch vertical moving pin 12. This swing of the torch base 10 around the torch support pin 11 changes the distance between the electrode 8 of the torch 7 and the surfaces of the tubes 22.

This welding head is for TIC welding, so that the torch 7 is provided with a shield gas discharge opening, not shown, around the fixing position of the non-consumable electrode 8, and to the discharge opening, a gas lens of wire netting or the like is attached, whereby a shield gas can be discharged evenly around an arc, whereby stable arc can be formed.

In addition, to reduce the thickness of the torch 7, the non-consumable electrode 8 is fixed by a set screw 9 from the side surface of the torch 7.

Furthermore, on the rear side portions of the rings 1 and 2 of this welding head, a clamp mechanism for clamping the tubes 22 is provided, and the clamp mechanism is connected to the rear lower side of the torch drive part body 3.

The clamp mechanism has a clamp block 17 with a lower side open and an arm 18 that freely opens and closes provided on one end of the clamp block 17 and a hand knob 19, and the arm 18 is swung by rotating the hand knob 19 to hold the tubes 22, and then the opening region at the lower side of the clamp block 17 is narrowed to clamp the tubes 22. By this clamp mechanism, the tubes 22 can be disposed concentrically with the torch vertical moving ring 2.

In addition, the rotation shafts of the torch rotating motor 4 and the torch vertical moving motor 5 are disposed orthogonally to the central axis of the two rings 1 and 2 that clamp the to-be-welded tubes 22, so that the motors 4 and 5 with large sizes and related parts thereof can be disposed without interference with the clamp mechanism (clamp block 17, clamp 18, etc.) that clamps the to-be-welded tubes 22.

Therefore, the degree of freedom in designing of the parts with large sizes such as the torch rotating motor 4 and the torch vertical moving motor 5 increases, and comparatively low-cost parts can be used.

In addition, the clamp mechanism that clamps the to-be-welded tubes 22 is not disposed near the torch rotating ring 1, so that the welding portion and the clamp mechanism are disposed comparatively apart from each other, and the clamp mechanism does not need to be made of a highly heat-resistant material, so that a comparatively low-cost welding head is obtained.

In addition, a wire feed mechanism 20 and a wire reel 21 are provided adjacent to the clamp mechanism. A wire (not shown) is fed to a wire nozzle 13 near the torch 7 by the wire feed mechanism 20.

As shown in FIG. 1, the bevel gear 30 that is attached and detached by the set screw 31a is attached to the rotation shaft of the torch rotating motor 4, and in addition, the drive shaft 27 having a bevel gear 27a on its one end to engage with the bevel gear 30 is also provided with sun gears 27b (FIG. 2) and 27c (FIG. 5) for driving the rings 1 and 2. The drive shaft 27 having the sun gears 27b and 27c transmits a driving force from the torch rotating motor 4 to the planet gears 24a for rotating the torch rotating ring 1 shown in FIG. 2 and the planet gears 24b for rotating the torch vertical moving ring 2 shown in FIG. 5 via the sun gears 27b and 27c.

The drive shaft 27 is rotatably supported onto the torch drive part body 3 via bearings 26a and 26f.

In addition, as shown in FIG. 6, a coupler 33b is connected to the rotation shaft of the torch vertical moving motor 5 by set screws 31d and 31e, and to the coupler 33b, a worm gear 35 integrated with a torch vertical moving shaft 36 is connected via the torch vertical moving shaft 36. Between the torch vertical moving shaft 36 and the torch drive part body 3 on the upper side and lower side of the worm gear 35, bearings 26t and 26s are provided, respectively. At the lower end of the torch vertical moving shaft 36, a hand knob 37 is provided which moves the torch 7 upward and downward by manual operations when the torch vertical moving motor 5 or the like malfunctions.

The worm gear 35 engages with the torch vertical moving transmission gear (worm wheel gear) 28 and transmits the driving force of the torch vertical moving motor 5 to the torch vertical moving transmission gear 28. The torch vertical moving transmission gear 28 is supported onto the torch drive part body 3 so that its outer circumference is rotatable via the bearings 26d and 26e (FIG. 1), so that it is rotatable around the drive shaft 27 even when the drive shaft 27 stops.

However, as shown in FIG. 6, when the torch vertical moving motor 5 stops, the torch vertical moving transmission gear 28 becomes unable to rotate since it engages with the worm gear 35 directly joined to the rotation shaft of the motor 5, so that during rotation of the drive shaft 27, only the planet gears 24b that engage with the gear on the inner circumferential side of the torch vertical moving transmission gear 28 rotate around the drive shaft 27. In this case, the vertical moving transmission gear 28 nearly rotates by receiving a reaction force, however, it becomes unable to rotate due to a great resistance of the worm gear 35.

In addition, on the outer circumferential surface of the torch vertical moving ring 2 and the outer circumferential surface of the torch rotating ring 1, gears are provided, respectively. To the gears on the outer circumferential surfaces of the rings 1 and 2 as shown in FIG. 3 and FIG. 4, driving forces of the motors 4 and 5 are transmitted via the plurality of spur gears 29a, 29c, 29d, 29e, and 29f in order and the plurality of spur gears 29b, 29g, 29h, 29i, and 29j in order.

Namely, when the driving forces of the motors 4 and 5 for rings 1 and 2 are transmitted to the planet gears 24a and 24b from the sun gears 27b and 27c of the drive shaft 27, the planet gears 24a and 24b rotate. The pins 25a and 25b as rotation shafts of the planet gears 24a and 24b are inserted in the side surfaces of the spur gears 29a and 29b, respectively, so that the spur gears 29a and 29b rotate around the drive shaft 27 via the bearings 26b and 26c when the planet gears 24a and 24b rotate.

In addition, the pairs of the planet gears 24a and 24b, the gears 29c and 29d, the gears 29g and 29h, the gears 29e and 29f, and the gears 29i and 29j have the same radiuses, respectively.

The spur gears 29c and 29e are supported by shafts 34a and 34c provided on the torch drive part body 3 via bearings 26g and 26i, and the spur gears 29d and 29f are supported by shafts 34b and 34d provided on the torch drive part body 3 via the bearings 26h and 26j. Likewise, the spur gears 29g and 29i are supported by shafts 34a and 34c provided on the torch drive part body 3 via bearings 26k and 26m, and the spur gears 29h and 29j are supported by shafts 34b and 34d provided on the torch drive part body 3 via bearings 26l and 26n.

The drive mechanisms for the spur gears 29d and 29f and the spur gears 29h and 29j are shown in FIG. 7, wherein the spur gears 29d and 29h are rotatably supported by the shaft 34b provided on the torch drive part body 3 via bearings 26h and 26j, and the spur gears 29f and 29j are rotatably supported by the shaft 34d provided on the torch drive part body 3 via bearings 26i and 26n.

As shown in FIG. 3, FIG. 6, and FIG. 8, an encoder shaft 32a to engage with the spur gear 29e is supported onto the torch drive part body 3 via bearings 26o and 26p. The encoder shaft 32a is connected to a torch rotating encoder 6 via an encoder shaft 32b that engages with the encoder shaft 32a and a coupler 33a that fixes the encoder shaft 32b by set screws 31b and 31c, so that the number of rotations of the spur gear 29e, that is, the number of rotations of the torch rotating ring 1 can be controlled by the encoder 6, and by the control made by the encoder 6, the welding speed and the rotating position in the circumferential direction at the butting portion of the tubes 22 can be controlled.

The upper and lower limit moving positions in the vertical direction of the torch 7 are set by limiting the upward and down ward movements by operations of a limit switch 38 that slides on the shorter diameter portion provided on the circumference of the torch vertical transmission gear 28 as shown in FIG. 6 and making the arc length constant by moving upward and downward the torch 7 so as to obtain a constant value of the welding voltage. In this embodiment, the torch vertical transmission gear 28 has teeth of only about ⅓ of the outer circumference, and the range to be driven by the worm gear 35 is limited. The terminal 38a of the limit switch 38 is in contact with the outer circumferential side surface without teeth on the shorter diameter portion of the gear 28 as shown in FIG. 6, and the gear 28 can rotate in this state, however, for example, when welding, when the gear 28 rotates in the arrow B direction and comes to the end of the outer circumferential side surface of the shorter diameter portion and the limit switch 38 comes into contact with the longer diameter portion of the gear 28, the torch 7 is at the operation lower limit position and stops the operation of the motor 5. When the gear 28 rotates in, for example, the arrow A direction and comes to the end of the outer circumferential surface of the shorter diameter portion, the torch 7 is at the operation upper limit position, and the terminal 38a of the limit switch 38 comes into contact with the longer diameter portion of the gear 28 and stops the operation of the motor 5.

In addition, as shown in FIG. 2 and FIG. 5, the four planet gears 24a engage with the internal-teeth gear 23, and the four planet gears 24b engage with the internal-teeth gear of the torch vertical moving transmission gear 28. In addition, the internal-teeth gear 23 shown in FIG. 2 is fixed at its outer circumference to the torch drive part body 3, so that it is not rotatable, and on the other hand, the torch vertical moving transmission gear 28 shown in FIG. 1 is rotatably supported at its outer circumference onto the torch drive part body 3 via the bearings 26d and 26e without being fixed to the torch drive part body 3, so that it is rotatable around the drive shaft 27 while the torch vertical moving motor 5 is driven even when the drive shaft 27 stops its rotation.

In addition, when the torch rotating motor 4 is driven, the drive shaft 27 provided with a bevel gear 27a on one end to engage with the bevel gear 30 rotates, and the sun gears 27b and 27c of the drive shaft 27 revolve the planet gears 24a and the planet gears 24b around the drive shaft 27. Due to the revolution of the planet gears 24a, the spur gear 29a rotates around the drive shaft 27, and a driving force transmitted to the spur gear 29a, the spur gear 29c, and the spur gear 29e in order and the driving force transmitted to the spur gear 29a, the spur gear 29d, and the spur gear 29f in order rotate the torch rotating ring 1. Due to the revolution of the planet gears 24b, the spur gear 29b rotates around the drive shaft 27, and a driving force transmitted to the spur gear 29b, the spur gear 29g, and the spur gear 29i in order and the driving force transmitted to the spur gear 29b, the spur gear 29h, and spur gear 29j in order rotate the torch vertical moving ring 2.

In this case, when the torch vertical moving motor 5 stops, the torch vertical moving transmission gear 28 becomes unable to rotate as in the case with the internal-teeth gear 23 fixed to the body 3, so that the speed of revolution of the planet gears 24b that engages with the teeth on the inner circumference of the torch vertical moving transmission gear 28 around the drive shaft 27 via the sun gear 27c becomes equal to the speed of revolution of the planet gears 24a around the drive shaft 27 via the sun gear 27b.

Therefore, when only the torch rotating motor 4 is driven, both the torch rotating ring 1 and the torch vertical moving ring 2 rotate around the tubes 22 at the same speed.

When the torch vertical moving motor 5 is driven, a driving force of the motor 5 is transmitted to the torch vertical moving transmission gear 28 that engages with the worm gear 35 provided on the rotation shaft of the motor, and the gear 28 rotates around the drive shaft 27. Due to the revolution of the planet gears 24b around the drive shaft 27 while engaging with the sun gear 27c that has stopped its rotation, the driving force is transmitted to the spur gear 29b, the spur gear 29g, and the spur gear 29i in order and the spur gear 29b, the spur gear 29h, and the spur gear 29j in order, respectively, whereby the torch vertical moving ring 2 rotates.

In this case, when the torch rotating motor 4 also rotates, as described above, the torch rotating ring 1 also rotates. When the torch vertical moving motor 5 is driven, the torch vertical moving transmission gear 28 can rotate on its axis of the drive shaft 27 (the internal-teeth gear 23 is always unrotatable), so that the planet gears 24b revolve around the drive shaft 27 at a speed higher or lower than the speed of revolution of the planet gears 24a around the drive shaft 27 in the same direction as or in reverse to the revolving direction of the planet gears 24a.

Therefore, the torch vertical moving ring 2 is rotated by the driving of the spur gear 29b, the spur gear 29g, and the spur gear 29i in order and the driving of the spur gear 29b, the spur gear 29h, and the spur gear 29j in order at a rotation speed higher or lower than that of the torch rotating ring 1 that is rotated by the driving of the spur gear 29a, the spur gear 29c, the spur gear 29e and the spur gear 29a, the spur gear 29d, and the spur gear 29f in order, and the rings 1 and 2 rotate in the same direction or in reverse to each other.

As described above, the torch vertical moving ring 2 is rotated by the sum of the driving forces of the torch rotating motor 4 and the torch vertical moving motor 5, and the torch vertical moving ring 2 rotates at a speed higher or lower than the speed of the torch rotating ring 1 in the same direction as or in reverse to the direction of the torch rotating ring 1. As a result, a rotation speed difference occurs between the torch rotating ring 1 and the torch vertical moving ring 2, whereby the torch 7 moves upward and downward with respect to the to-be-welded tubes 22.

Figure 13:
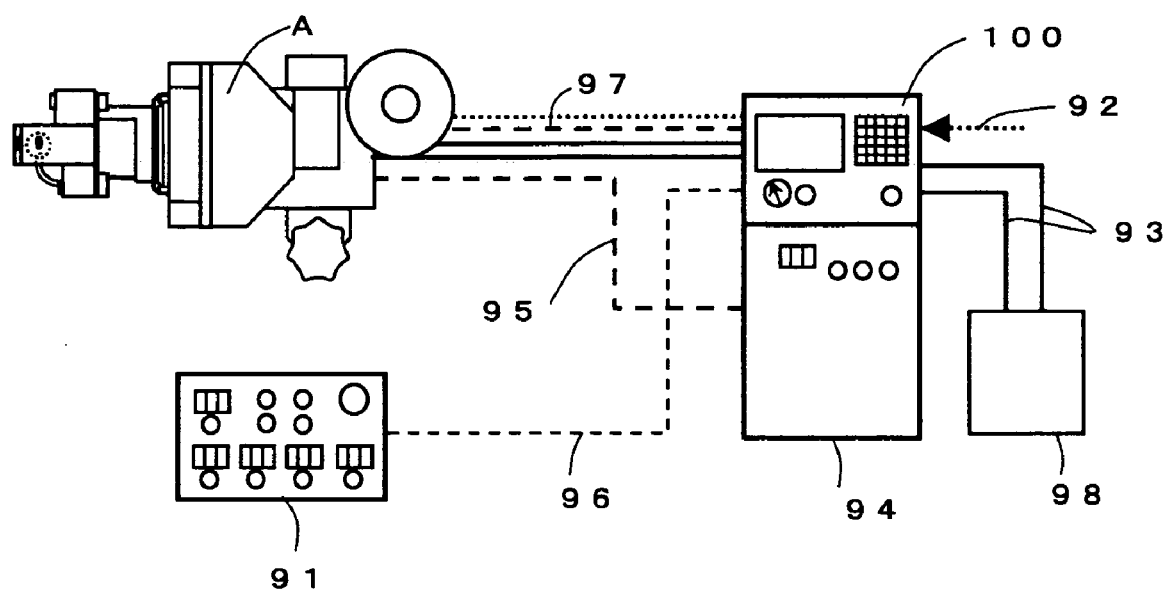
FIG. 13 is a drive control mechanism view of the torch rotating motor 4 and the torch vertical moving motor 5 of the embodiment of the invention.
Figure 14:
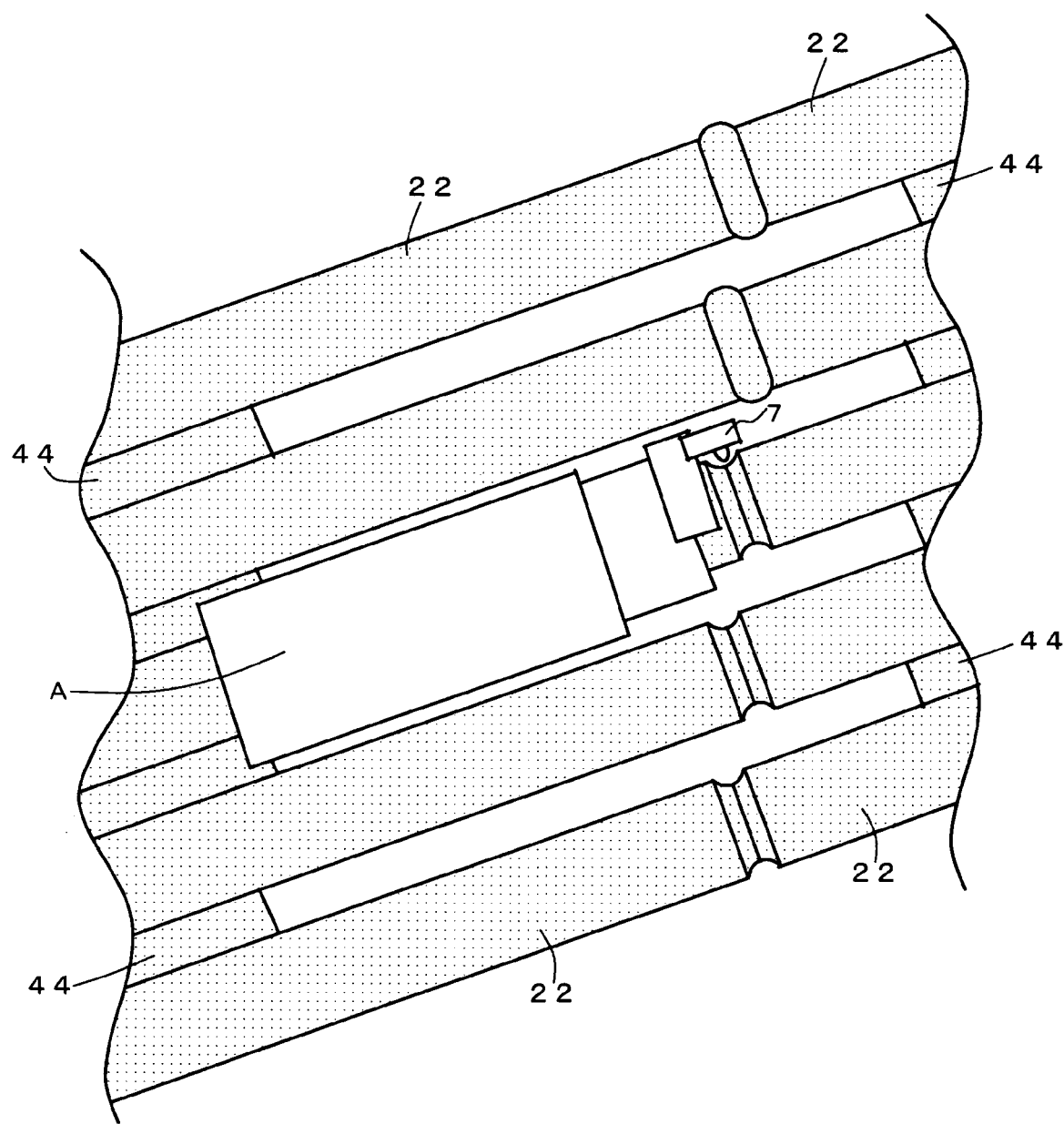
FIG. 14 is an explanatory view of tube butt welding of a number of tubes of waterwall tubes for a furnace wall by using an all position automatic welding head.
Figure 1:
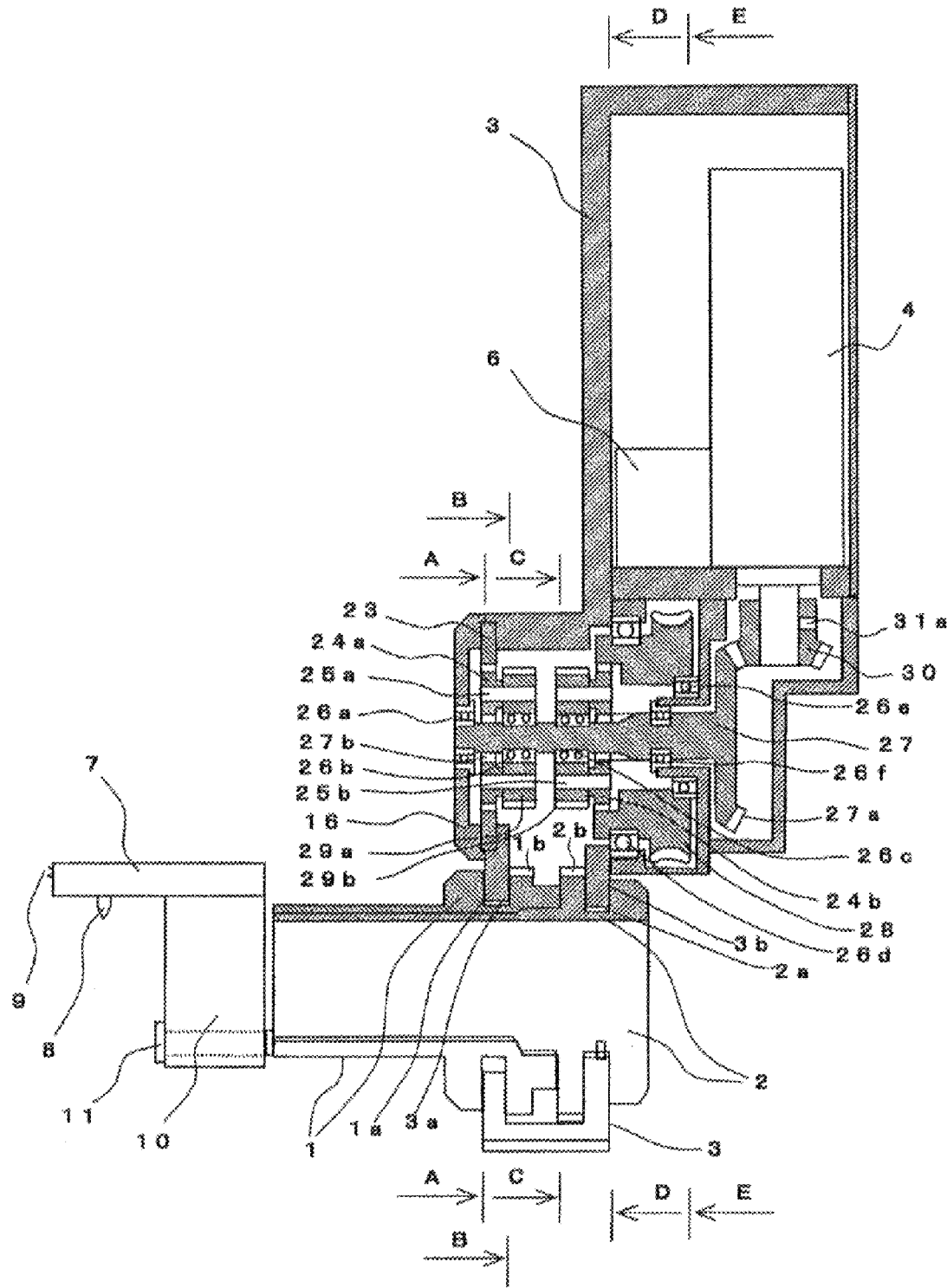
Figure 2:
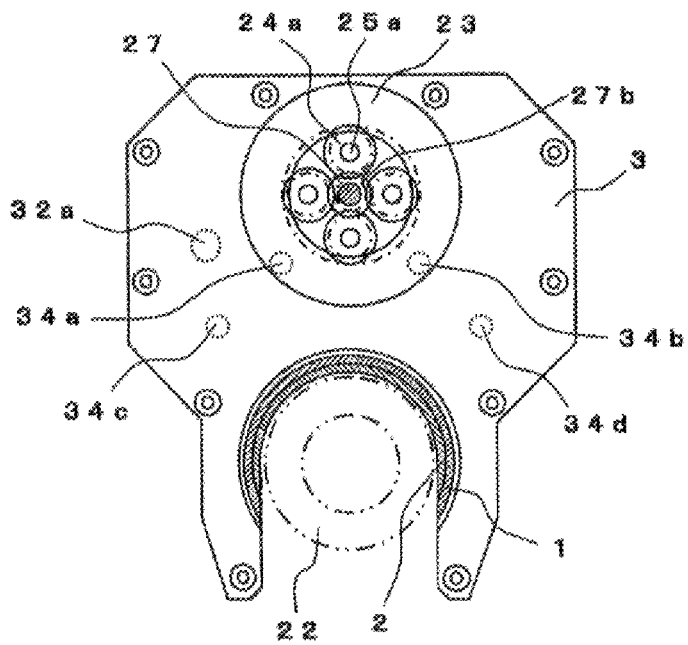
Figure 3:
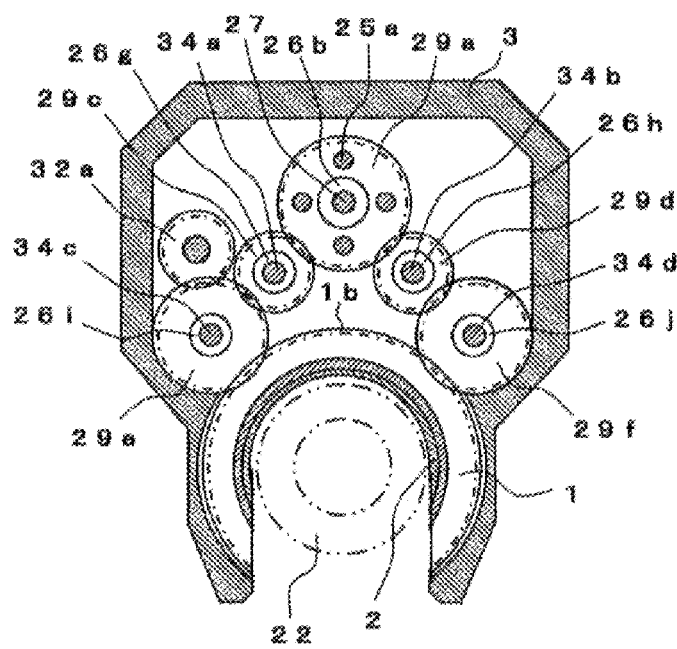
Figure 4:
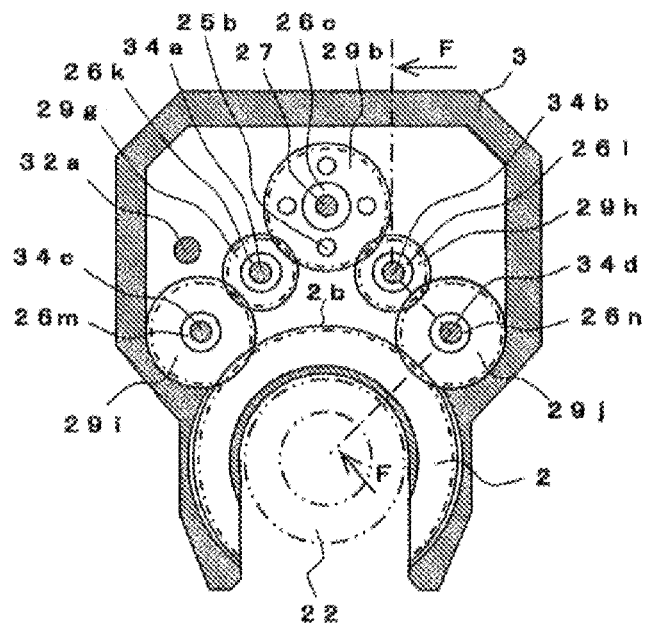
Figure 5:
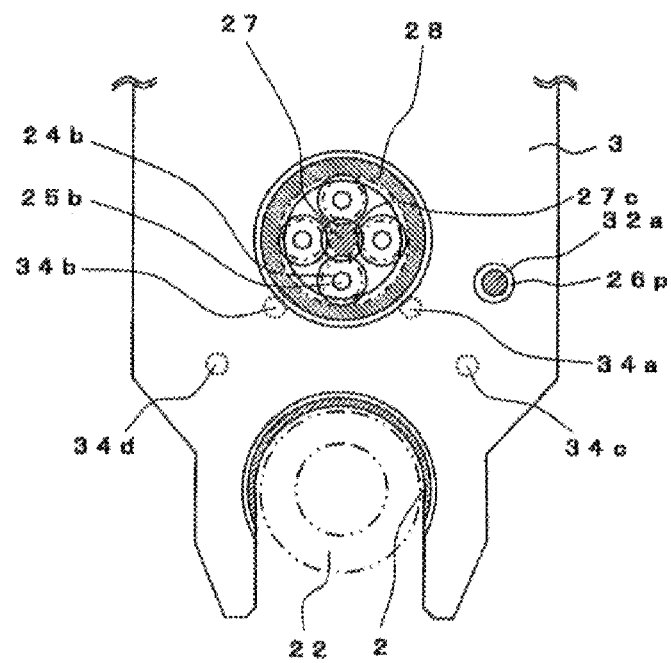

FIG. 13 is a constructional view showing a construction for controlling the operations of the welding head A by the control device 100 based on information inputted through a remote controller box 91 of setting conditions for driving and controlling the driving power sources of the torch rotating motor 4 and the torch vertical moving motor 5 of this embodiment, and a construction including a hose 92 for shield gas to be supplied to the welding head A and a cooling water hose 93 for supplying cooling water to the torch 7 from a water tank 98, a power cable 95 for power supply to the welding head A from a welding power supply 94, a signal cable 96 connecting the remote controller box 91 to the control device 100, and a control cable 97 for controlling the motors 4 and 5 of the welding head A and the encoder 6.

As illustrated, (1) functional operation such as torch positional adjustment before welding and (2) functional operation of the torch during welding of the torch rotating ring 1 and the torch vertical moving ring 2 are summarized below. The operating directions of the rings 1 and 2 are the directions of the arrows A and B shown in FIG. 9.

(1) Functional Operation Such as Positional Adjustment of the Torch 7 Before Welding
(a) Rotate the torch 7 in the arrow A direction (vertical movement is stopped.)
 Torch rotating ring 1: rotates in the arrow A direction
 Torch vertical moving ring 2: rotates in the arrow A direction
 Rotation speeds of the rings 1 and 2: equal to each other
 Torch rotating motor 4: driven
 Torch vertical moving motor 5: stopped
(b) Rotate the torch 7 in the arrow B direction (vertical movement is stopped.)
 Torch rotating ring 1: rotates in the arrow B direction
 Torch vertical moving ring 2: rotates in the arrow B direction
 Rotation speeds of the rings 1 and 2: equal to each other
 Torch rotating motor 4: driven
 Torch vertical moving motor 5: stopped
(c) Move the torch 7 upward while stopping rotation
 Torch rotating ring 1: stopped
 Torch vertical moving ring 2: rotates in the arrow A direction
 The higher the rotation speed of the torch vertical moving ring 2, the higher the upward movement speed of the torch 7.
 Torch rotating motor 4: stopped
 Torch vertical moving motor 5: driven
(d) Move the torch 7 downward while stopping rotation
 Torch rotating ring 1: stopped
 Torch vertical moving ring 2: rotates in the arrow B direction
 The higher the rotation speed of the torch vertical moving ring 2, the higher the downward movement speed of the torch 7.
 Torch rotating motor 4: stopped
 Torch vertical moving motor 5: driven (2) Functional Operation of the Torch 7 During Welding
The wire inserting direction becomes the welding advancing direction. Namely, the arrow B direction is the welding direction.
The rotation speed of the torch rotating ring 1 becomes the welding speed, and the ring 1 rotates at a constant speed.
(a) Stop the Vertical Movements of the Torch 7

Torch rotating ring 1: rotates in the arrow B direction
Torch vertical moving ring 2: rotates in the arrow B direction
Rotation speeds of the rings 1 and 2: equal to each other
Torch rotating motor 4: driven
Torch vertical moving motor 5: stopped
(b) Move the torch 7 upward
Torch rotating ring 1: rotates in the arrow B direction
Torch vertical moving ring 2: rotates in the arrow B direction or the arrow A direction
When the ring 2 rotates in the arrow B direction, rotation speeds are set to ring 2<ring 1. The greater the rotation speed difference between the rings 1 and 2, the higher the upward movement speed of the torch 7. When the ring 2 rotates in the arrow A direction, the upward movement speed of the torch 7 becomes higher.
Torch rotating motor 4: driven
Torch vertical moving motor 5: driven
(c) Move the torch 7 downward
Torch rotating ring 1: rotates in the arrow B direction
Torch vertical moving ring 2: rotates in the arrow B direction
Rotation speeds of the rings 1 and 2: ring 1<ring 2
The greater the rotation speed difference between the ring 1 and the ring 2, the higher the downward movement speed of the torch 7.
Torch rotating motor 4: driven
Torch vertical moving motor 5: driven According to this embodiment, torch positional adjustment before welding and torch functional operations during welding of the torch rotating ring 1 and the torch vertical moving ring 2 are possible, so that vertical movements between the to-be-welded tubes 22 and the torch 7 can be easily controlled while the torch 7 is rotated around the tubes 22, whereby stable high-quality welding of the butting portion of the tubes 22 can be efficiently carried out.

INDUSTRIAL APPLICABILITY

The invention is usable not only for welding of a narrow gap of a butting portion of tubes such as waterwall tubes of a boiler, but also for other welding connections between narrow cylindrical tubes.

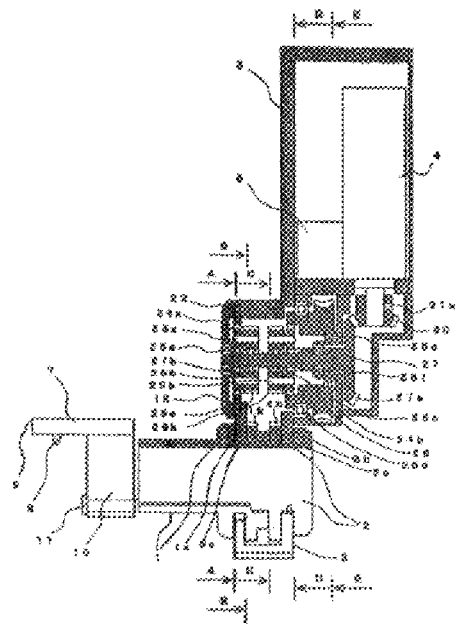

What is claimed is:
1. An all position welding head for tube butt welding, comprising:
a welding torch;
an arch-shaped torch base that supports the torch;
a horseshoe-shaped torch rotating ring that rotates on the outer circumferences of the to-be-welded tubes and supports one end of the torch base at a front end of the torch base, wherein the torch rotating ring matches the torch with the central axis of the to-be-welded tubes;
a horseshoe-shaped torch vertical moving ring provided inside the torch rotating ring, the torch vertical moving ring supporting the other end of the torch base at the front end of the torch base, wherein the torch vertical moving ring is disposed on a circle concentric with the torch rotating ring;
a first drive mechanism including a first gear group that is configured to rotate the torch rotating ring around the to-be-welded tubes, a second gear group disposed in parallel to the first gear group and configured to rotate the torch vertical moving ring around the to-be-welded tubes together with a part of the first gear group, a drive shaft configured to drive the first gear group and the second gear group, and a torch rotating motor that drives the drive shaft;
a second drive mechanism including a third gear group that drives and rotates the torch vertical moving ring around the to-be-welded tubes together with the second gear group except for a first gear of the second gear group, the second drive mechanism driving the ring at a speed higher or lower than the speed of the first gear group in the same direction as or in reverse to the rotating direction of the ring torch rotating ring during driving the first gear group, and a torch vertical moving motor configured to drive the third gear group;
a control that controls the driving of the first drive mechanism and the second drive mechanism, respectively;
a filler wire feed mechanism that feeds a filler wire to the vicinity of the torch; and
a clamp mechanism that clamps the to-be-welded tubes at a position different from the positions of the torch rotating ring and the torch vertical moving ring.
2. The all position welding head for tube butt welding according to claim 1, wherein
the first gear group includes a gear (30) directly joined to the rotation shaft of the torch rotating motor, a gear (27a) provided at the end of the drive shaft to engage the gear (30), a sun gear (27b) provided on the axis of the drive shaft, planet gears (24a) configured to be driven by the rotating driving force of the sun gear (27b), an internal-teeth gear (23) including teeth on an inner circumferential side to engage with the planet gears (24a) and is not rotatable, a gear (29a) in which the rotation shafts (25a) of the planet gears (24a) are freely fitted to on the side surface and are configured to rotate according to revolution of the planet gears (24a) around the drive shaft, one or more pairs of gears (29c and 29e, 29d and 29f) that successively transmit a driving force from the gear (29a), and a gear (1b) provided on the outer circumference of the torch rotating ring to engage the gears (29e and 29f),
the second gear group includes a sun gear (27c) provided on the drive shaft to be driven by the torch rotating motor, planet gears (24b) to be driven by a rotating driving force of the sun gear (27c), a gear (29b) that the rotation shafts of the planet gears (24b) are freely fitted to on a side surface thereof and rotates according to revolution of the planet gears (24b) around the drive shaft, one or more pairs of gears (29g and 29i, 29h and 29j) that successively transmit a driving force from the gear (29b), and a gear (2b) provided on the outer circumference of the torch vertical moving ring to engage the gears (29i and 29j),
the third gear group includes a gear (35) directly joined to the rotation shaft of the torch vertical moving motor and a rotatable torch vertical moving transmission gear (28) having outer circumferential teeth that engage the gear (35) and inner circumferential teeth that engage the planet gears (24b)
the planet gears (24a) of the first gear group and the planet gears (24b) of the second gear group, the gear (29a) of the first gear group and the gear (29b) of the second gear group, the gears (29c and 29d) of the first gear group and the gears (29g and 29h) of the second gear group, and the gears (29e and 29f) of the first gear group and the gears (29i and 29j) of the second gear group have the same radiuses, respectively.

3. The all position welding head for tube bull welding according to claim 1, wherein the torch rotating ring is driven by the torch rotating motor, and the torch vertical moving ring has a gear mechanism configured to be driven by either one of the torch rotating motor and the torch vertical moving motor.

4. The all position welding head for tube butt welding according to claim 1, wherein the rotation range of a torch vertical moving transmission gear (28) is limited so that it rotates one turn or less.

5. The all position welding head for tube butt welding according to claim 1, wherein the gear (30) and the gear (27a) of the drive shaft that engages the gear (30) are bevel gears, the gear (35) is a cylindrical worm gear, the torch vertical moving transmission gear that engages the gear (35) is a worm wheel gear, and the rotation shafts of the torch rotating and vertical moving motors are disposed in a direction orthogonal to the center axis of the two rings.

6. The all position welding head for tube butt welding according to claim 1, wherein one end of the arc-shaped torch base that supports the torch is supported at one front end of the horseshoe shape of the torch rotating ring by a torch support pin, the other end of the torch base is supported at one front end of the horseshoe shape of the torch vertical moving ring by a torch vertical pin, wherein either one of the torch support pin and the torch vertical pin is configured to move the torch base vertically.

7. The all position welding head for tube butt welding according to claim 1, wherein the clamp mechanism is constructed so as to clamp the to-be-welded tubes so that the center of the axis of the to-be-welded tubes are disposed concentrically with the torch rotating ring.

8. The all position welding head for tube butt welding according to claim 1, wherein a torch driving body which houses the base part side of the torch rotating ring and the base part side of the torch vertical moving ring inside the opening part opened downward, and houses the first through third gear groups and the torch rotating and torch vertical moving motors, is provided, and in the body, projections are provided that slide inside grooves provided along a direction orthogonal to the center of the axis of the torch rotating and vertical moving rings respectively.

9. A method for operating the all position welding head according to claim 1, wherein the torch rotating ring is driven by the torch rotating motor and the torch vertical moving ring is driven by the torch rotating motor and/or the torch vertical moving motor.

10. A method for operating the all position welding head according to claim 1, wherein the torch rotating ring and the torch vertical moving ring are rotated at the same speed by driving of only the torch rotating motor.

11. A method for operating the all position welding head according to claim 1, wherein the torch vertical moving ring is rotated in a rotating direction at a rotating speed that is the sum of the driving forces of the torch rotating motor and the torch vertical moving motor.

12. A method for operating the all position welding head according to claim 1, wherein before welding the torch rotating motor is driven so as to rotate the torch clockwise or counterclockwise while the torch vertical moving motor is stopped, the torch rotating ring and the torch vertical moving ring are rotated at the same speed to make the torch reach a predetermined position while upward movement of the torch to be distanced from the to-be-welded tubes or the downward movement to approach the to-be-welded tubes are stopped, and thereafter, the torch vertical moving ring motor is rotated so as to rotate the torch vertical moving ring [clockwise or counterclockwise while the torch rotating motor is stopped, and the torch is moved upward or downward to adjust the position of the torch.

13. A method for operating the all position welding head according to claim 1, wherein during welding, while the torch is rotated around the to-be-welded tubes by rotating the torch rotating ring and the torch vertical moving ring by the torch rotating motor in a direction matching the inserting direction of the filler wire, when the arc length is proper, the torch vertical moving motor is stopped and both rings are rotated in the direction at the same speed to carry out welding while the movement of the torch upward to be distanced from the to-be-welded tubes or downward to approach the to-be-welded tubes is stopped, when the arc length is short, the torch vertical moving motor is driven so that the torch vertical moving ring rotates in a direction matching the inserting direction of the filter wire or in the opposite direction, and while the torch is moved upward to be distanced from the to-be-welded tubes, welding is carried out, and when the arc length is long, the torch vertical moving motor is driven so as to rotate the torch vertical moving ring in the direction matching the inserting direction of the filler wire, and while the torch is moved downward to approach the to-be-welded tubes, welding is carried out.

14. The method for operating an all position welding head according to claim 13, wherein the torch rotating ring is rotated at the predetermined speed while the rotation speed of the torch vertical moving ring is changed, wherein when the torch vertical moving ring is rotated in a direction matching the inserting direction of the filler wire to move the torch upward, the rotation speed of the torch vertical moving ring is made lower than the rotation speed of the torch rotating ring, and the torch vertical moving ring is rotated in a direction matching the inserting direction of the filler wire, and when the torch is moved downward, the rotation speed of the torch vertical moving ring is made higher than the rotation speed of the torch rotating ring.

15. The all position welding head for tube butt welding according to claim 2, wherein the torch rotating ring is driven by the torch rotating motor, and the torch vertical moving ring has a gear mechanism to be driven by the torch rotating motor and/or the torch vertical moving motor.

* * * * *

UNITED STATES PATENT AND TRADEMARK OFFICE
CERTIFICATE OF CORRECTION

| | | |
|---|---|---|
| PATENT NO. | : 7,232,974 B2 | Page 1 of 5 |
| APPLICATION NO. | : 11/192174 | |
| DATED | : June 19, 2007 | |
| INVENTOR(S) | : Hiroshi Watanabe et al. | |

It is certified that error appears in the above-identified patent and that said Letters Patent is hereby corrected as shown below:

The title page showing the illustrative figure should be deleted to be replaced with the attached title page.

At Figure 1 of the printed patent, the following reference numerals should be added --1b--, --2b--, and --27b--. As shown on the attached page.

At Figure 3 of the printed patent, the following reference numeral should be added --1b--. As shown on the attached page.

At Figure 4 of the printed patent, the following reference numeral should be added --2b--. As shown on the attached page.

At column 14, line 6 of the printed patent, "bearings 261" should read --bearings 26I--.

At column 19, line 1 (claim 3, line 1) of the printed patent, "bull" should read --butt--.

At column 20, line 10 (claim 12, line 12) of the printed patent, "[clockwise or counterclockwise" should read --clockwise or counterclockwise--.

At column 20, line 28 (claim 13, line 16) of the printed patent, "filter" should read --filler--.

Signed and Sealed this

Twenty-fourth Day of February, 2009

JOHN DOLL
*Acting Director of the United States Patent and Trademark Office*

(12) United States Patent
Watanabe et al.

(10) Patent No.: US 7,232,974 B2
(45) Date of Patent: Jun. 19, 2007

(54) ALL POSITION AUTOMATIC WELDING HEAD AND METHOD FOR OPERATING THE SAME

(75) Inventors: Hiroshi Watanabe, Kure (JP); Toshiharu Myoga, Kure (JP); Masahiro Kanatani, Kure (JP); Koichi Mitsuhata, Kure (JP); Keiji Ueda, Kure (JP); Seiji Kikuhara, Kure (JP); Toshiharu Nagashima, Kure (JP); Shigeru Fujimoto, Kure (JP)

(73) Assignee: Babcock-Hitachi Kabushiki Kaisha, Tokyo (JP)

(*) Notice: Subject to any disclaimer, the term of this patent is extended or adjusted under 35 U.S.C. 154(b) by 0 days.

(21) Appl. No.: 11/192,174

(22) Filed: Jul. 29, 2005

(65) Prior Publication Data
US 2006/0076318 A1    Apr. 13, 2006

(30) Foreign Application Priority Data
Oct. 13, 2004 (JP) ............... 2004-298353

(51) Int. Cl.
*B23K 9/12* (2006.01)
(52) U.S. Cl. ............... 219/60 A; 219/125.11
(58) Field of Classification Search ............ 219/60 A, 219/124.03, 125.11
See application file for complete search history.

(56) References Cited

U.S. PATENT DOCUMENTS 4,163,406 A * 9/1979 Tamari ............... 219/60 A
4,379,215 A    4/1983 Rohrberg
5,107,090 A * 4/1992 Cailla et al. ............ 219/60 A
5,841,089 A    11/1998 Martineas

FOREIGN PATENT DOCUMENTS

JP    9-271939       10/1997
JP    2001-225165    8/2001

OTHER PUBLICATIONS

English language Abstract of JP 9-271939.
English language Abstract of JP 2001-225165.

* cited by examiner

*Primary Examiner*—Clifford C. Shaw
(74) *Attorney, Agent, or Firm*—Greenblum & Bernstein, P.L.C.

(57) ABSTRACT

A welding head which can easily move the torch portion of the welding head in the circumferential direction and the vertical moving direction of the outer circumference of the to-be-welded tubes even in a narrow gap, includes a torch rotating ring that rotates on the outer circumferences of the tubes by matching with the central axis of the to-be-welded tubes and a torch vertical moving ring disposed concentrically with the ring inside the ring, provided with a torch base for supporting a torch on the front ends, a first gear group for driving and rotating the ring around the tubes, a second gear group that is disposed in parallel to the first gear group and drives and rotates the ring around the tubes, a drive shaft for driving the two gear groups, and a torch rotating motor for driving the drive shaft, and a third gear group that can drive the ring while rotating it in the same direction as or in reverse to that of the ring at a speed equal to or higher or lower than that of the first gear group for rotating the ring around the tubes and vertically moving the torch, and a torch vertical moving motor for driving this third gear group.

15 Claims, 11 Drawing Sheets